(12) United States Patent  
Iwasa

(10) Patent No.: US 7,388,633 B2
(45) Date of Patent: Jun. 17, 2008

(54) REFLECTIVE LIQUID CRYSTAL DISPLAY

(75) Inventor: Takayuki Iwasa, Yamato (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 152 days.

(21) Appl. No.: 10/731,018

(22) Filed: Dec. 10, 2003

(65) Prior Publication Data

US 2004/0114075 A1 Jun. 17, 2004

(30) Foreign Application Priority Data

Dec. 13, 2002 (JP) .......................... P2002-362406

(51) Int. Cl.
*G02F 1/1335* (2006.01)
*G02F 1/1343* (2006.01)
*G02F 1/136* (2006.01)
*H01L 3/00* (2006.01)
*G09G 3/36* (2006.01)

(52) U.S. Cl. .................. 349/113; 349/38; 349/41; 349/42; 349/43; 257/59; 257/72; 345/92

(58) Field of Classification Search ................ 349/113, 349/41–43, 38; 257/59, 72; 345/92
See application file for complete search history.

(56) References Cited

U.S. PATENT DOCUMENTS 6,181,398 B1 * 1/2001 Libsch et al. .............. 349/113
6,437,839 B1 * 8/2002 Cacharelis ................. 349/39
6,593,983 B2 * 7/2003 Okuda et al. .............. 349/113
6,693,691 B2 * 2/2004 Sato et al. .................. 349/113
6,781,650 B1 * 8/2004 Colgan et al. .............. 349/110
7,158,205 B2 * 1/2007 Yasukawa ................... 349/158

FOREIGN PATENT DOCUMENTS

| JP | H09-171195 | 6/1997 |
| JP | 2000-193994 | 7/2000 |
| JP | 2001-318376 | 11/2001 |
| JP | 2002-040482 | 2/2002 |
| JP | 2002-357820 | 12/2002 |

* cited by examiner

*Primary Examiner*—Andrew Schechter
*Assistant Examiner*—Hoan Nguyen
(74) *Attorney, Agent, or Firm*—The Nath Law Group; Jerald L. Meyer; Matthew J. Moffa

(57) ABSTRACT

A reflective LCD has first and second light blocking metal films that are formed one upon another between a semiconductor substrate and reflective pixel electrodes with an insulating film being laid on and under each of the light blocking metal films, to block part of read light, which has been made incident from a transparent substrate side to liquid crystals through a counter electrode and has penetrated a third interlayer insulating film through openings formed between adjacent ones of the reflective pixel electrodes, from reaching switching elements. One of the first and second light blocking metal films covers the openings formed between adjacent ones of the reflective pixel electrodes. The first and second light blocking metal films in each pixel are electrically connected, through third via holes, to a corresponding switching element, reflective pixel electrode, and storage capacitor.

5 Claims, 13 Drawing Sheets

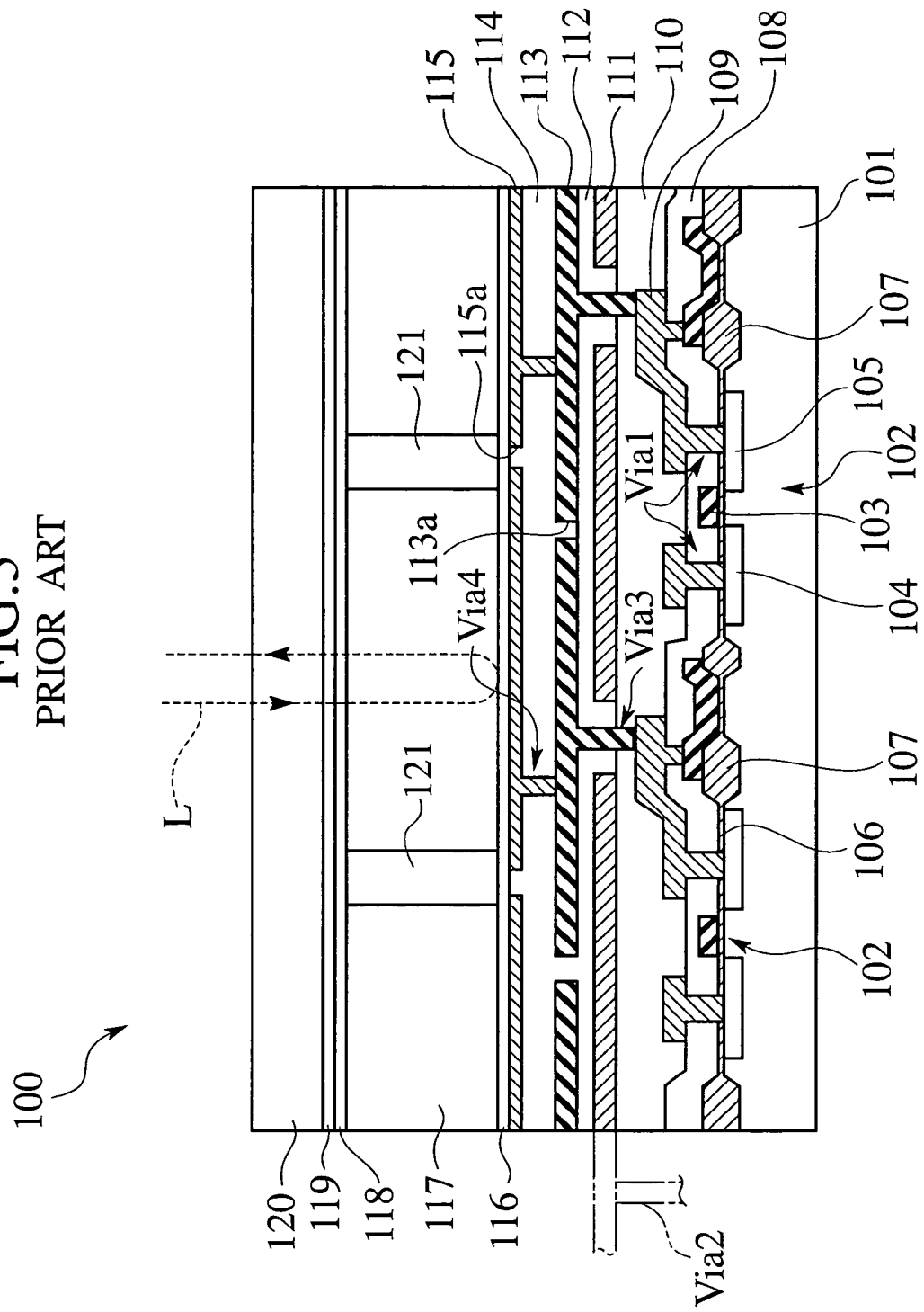

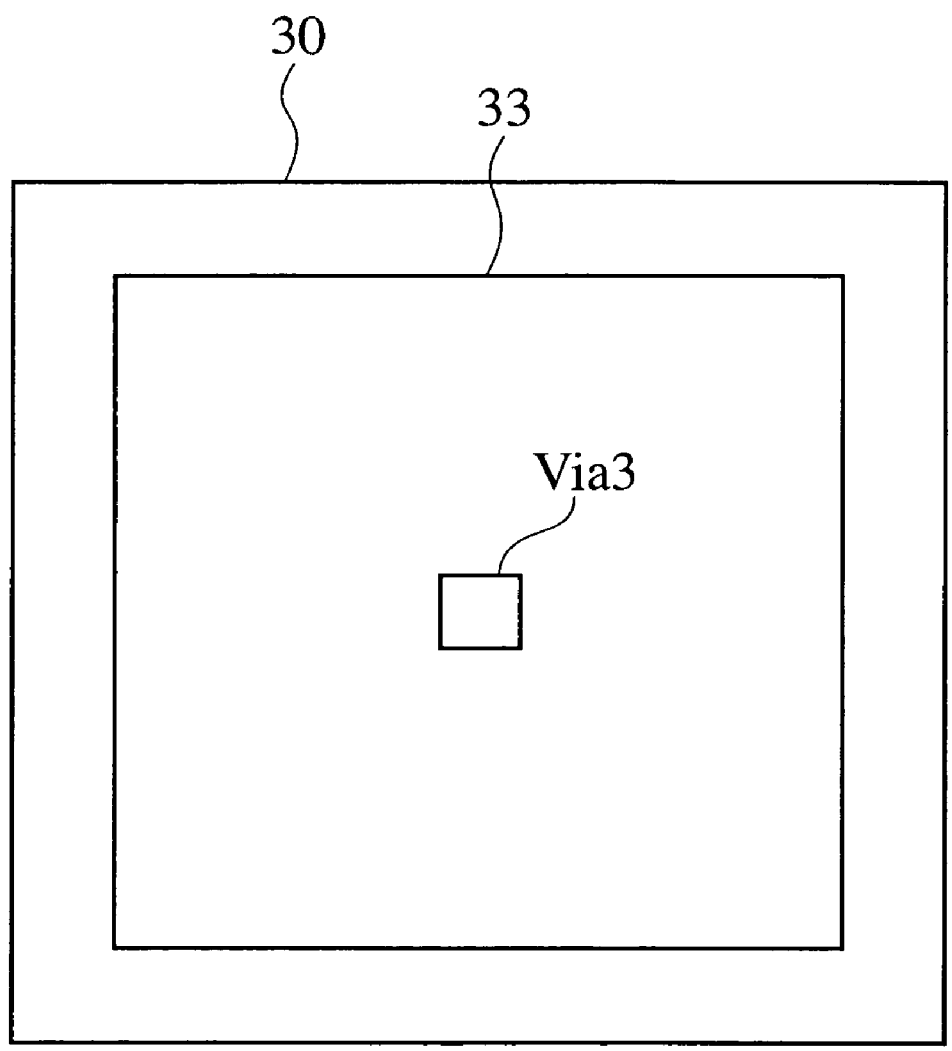

ONE LOCATION SERVING
AS STORAGE CAPACITOR

THREE LOCATIONS SERVING
AS STORAGE CAPACITORS

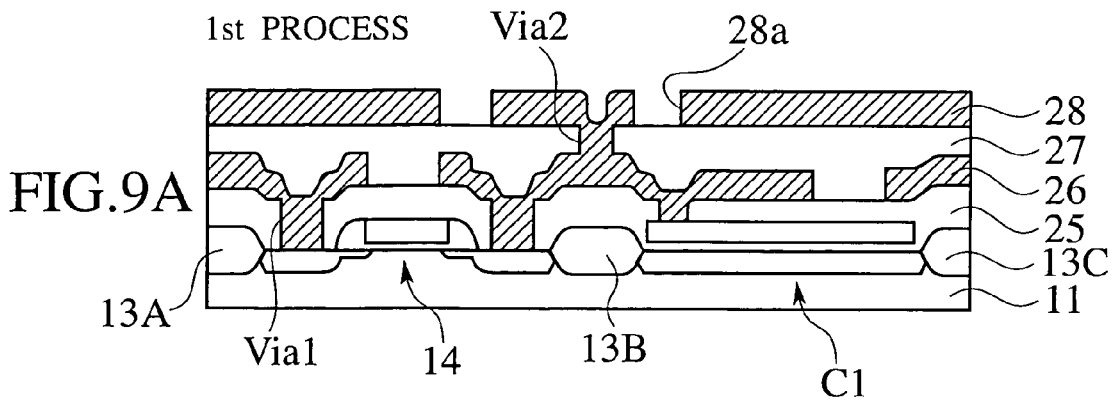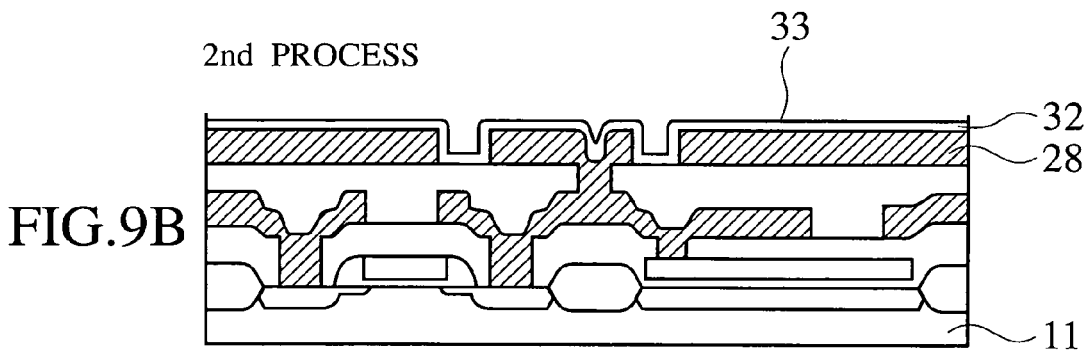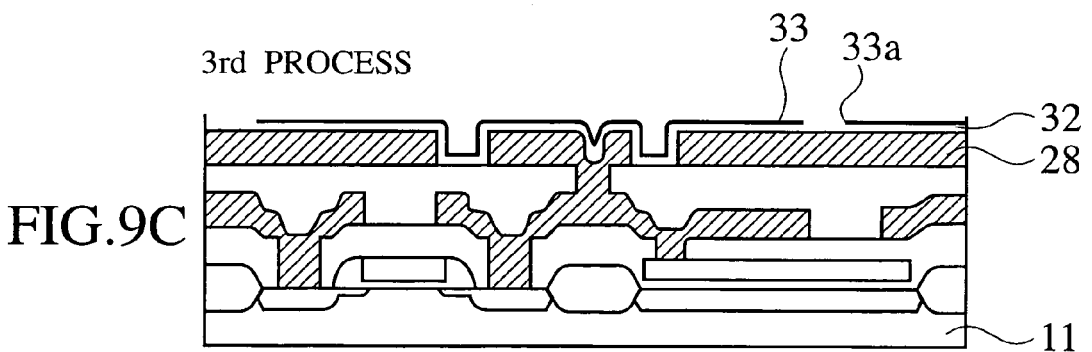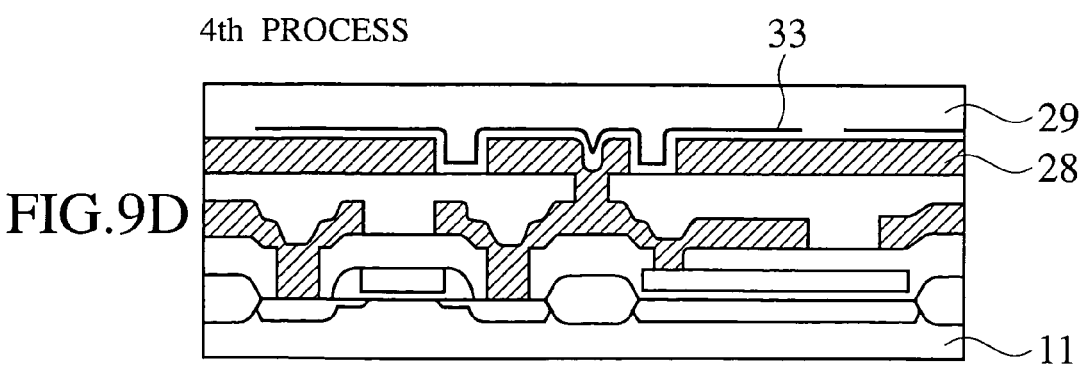

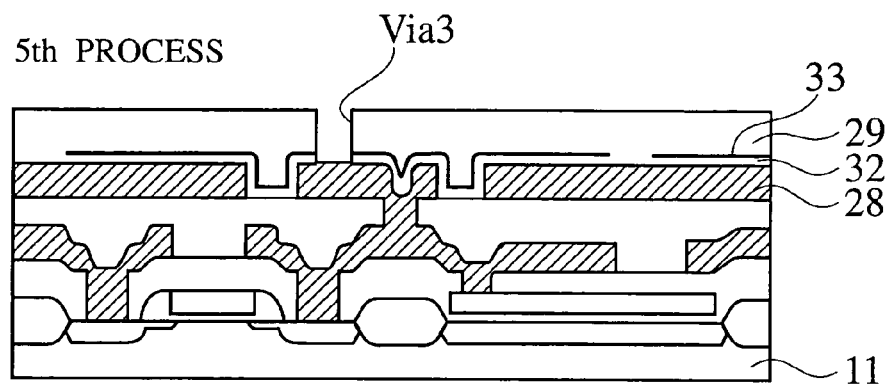
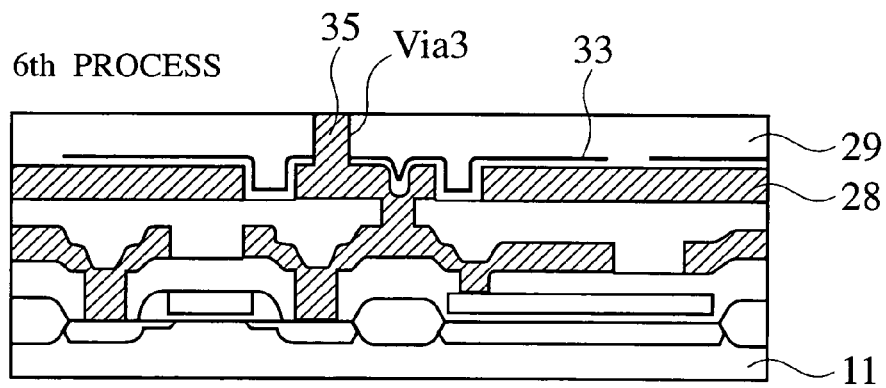
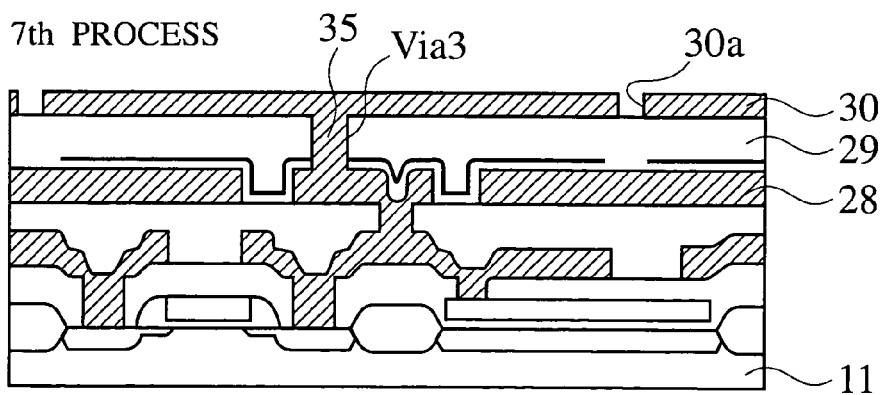

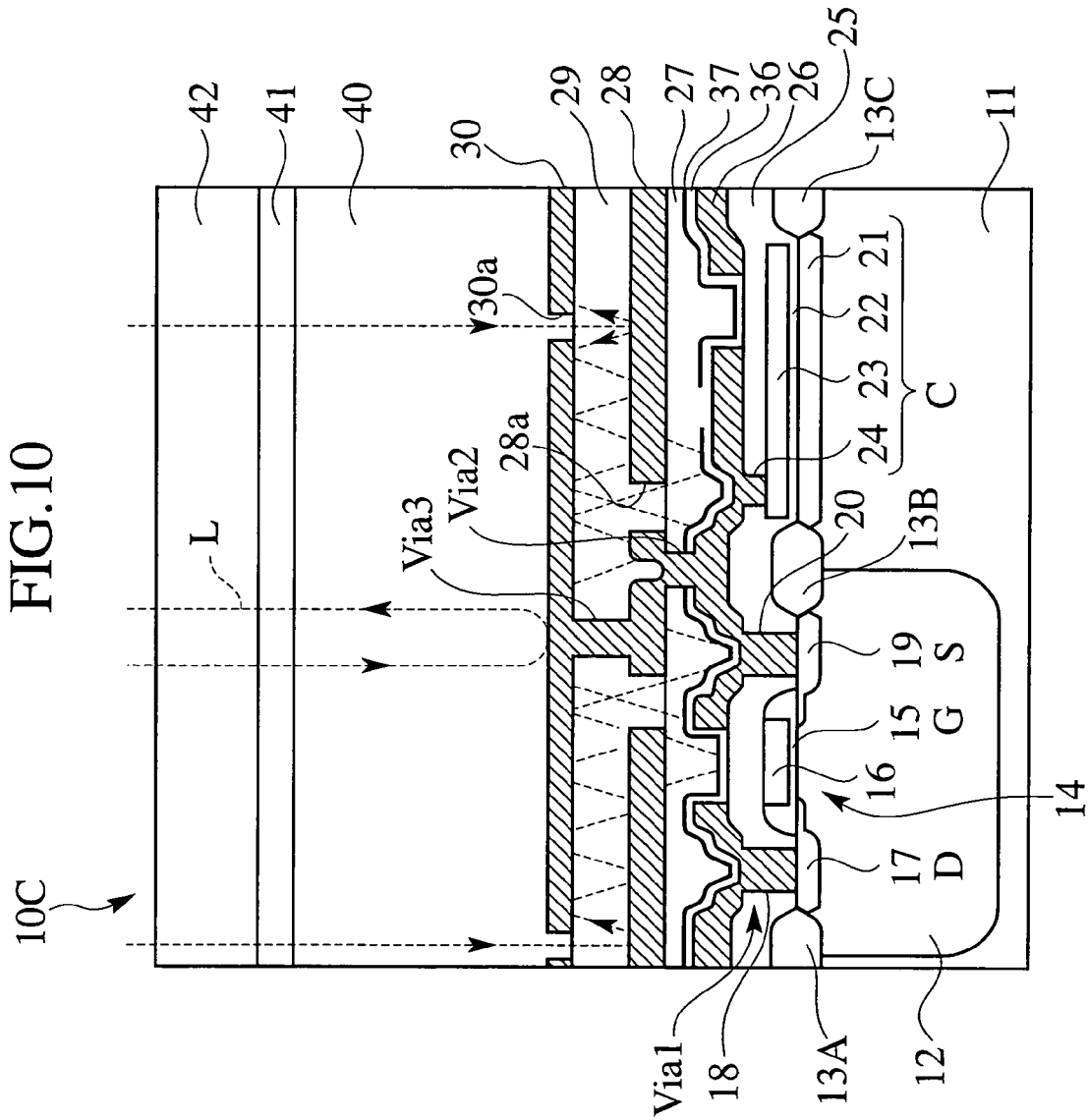

REFLECTIVE LIQUID CRYSTAL DISPLAY

BACKGROUND OF THE INVENTION

1. Field of the Invention

The present invention relates to a reflective liquid crystal display (LCD), and particularly, to a reflective LCD capable of reducing a leak current produced in switching elements formed on a semiconductor substrate. The leak current is produced when read light that has been emitted to a transparent substrate and made incident to liquid crystals through a counter electrode partly passes through openings formed between adjacent reflective pixel electrodes, penetrates an insulating film adjoining the reflective pixel electrodes, and reaches the switching elements.

2. Description of Related Art

Recently, projection LCDs to display images on large screens are extensively used for, for example, outdoor public displays, control operation displays, and high-resolution image displays conforming to hi-vision broadcast standards and SVGA computer graphics standards.

The projection LCDs are largely classified into transmission LCDs based on a transmission method and reflective LCDs based on a reflection method. The transmission LCDs have a drawback that a TFT (thin film transistor) formed in each pixel is unable to serve as a transmission area to transmit light, and therefore, reduces a numerical aperture. For this reason, the reflective LCDs are attracting attention.

Generally, the reflective LCD employs a semiconductor substrate (Si substrate) on which a plurality of switching elements are formed and electrically isolated from one another. Over the switching elements, a plurality of functional films are formed one upon another. On a top one among the functional films, a plurality of reflective pixel electrodes are formed and electrically isolated from one another. The reflective pixel electrodes correspond to the switching elements, respectively. One switching element, one reflective pixel electrode connected to the switching element, and a storage capacitor provided for the switching element are grouped to form a pixel. Such pixels are arranged in a matrix on the semiconductor substrate. Facing the reflective pixel electrodes, a transparent counter electrode commonly serving for all pixels is formed on the reverse of a transparent substrate (glass substrate). Between the reflective pixel electrodes and the counter electrode, liquid crystals are sealed to form the reflective LCD. From the transparent substrate side, color-image read light is made incident through the counter electrode to the liquid crystals. At the same time, the switching elements change potential differences of the corresponding reflective pixel electrodes relative to the counter electrode in response to image signals, to control orientation of the liquid crystals, modulate and reflect the color-image read light, and emit the light from the transparent substrate.

FIG. 1 is an enlarged sectional view schematically showing a pixel in a reflective LCD according to a related art 1. FIG. 2A is a block diagram explaining an active-matrix drive circuit in the reflective LCD of the related art 1, and FIG. 2B is an enlarged schematic view showing a part X of FIG. 2A.

The reflective LCD 10A of the related art 1 of FIG. 1 is designed for a standard reflective projector. Among a plurality of pixels of the LCD 10A to display images, one pixel will be explained with reference to the enlarged views. A semiconductor substrate 11 serving as a base of the LCD is a p-type Si substrate (or an n-type Si substrate) made of monocrystalline silicon. At the left side of the semiconductor substrate (hereinafter referred to as p-type Si substrate) 11 in FIG. 1, a p-well region 12 is formed and is electrically isolated pixel by pixel with the use of left and right field oxide films 13A and 13B. Within the p-well region 12, a switching element 14 is formed, which is a MOSFET (metal oxide semiconductor field effect transistor).

The switching element (hereinafter referred to as MOSFET) 14 has a gate G consisting of a gate oxide film 15 approximately formed at the center of the surface of the p-well region 12 and a gate electrode 16 made of polysilicon on the gate oxide film 15.

On the left side of the gate G of the MOSFET 14 in FIG. 1, a drain region 17 is formed, and on the drain region 17, a drain electrode 18 is formed from aluminum wiring in a first via hole Via1, to constitute a drain D.

On the right side of the gate G of the MOSFET 14 in FIG. 1, a source region 19 is formed, and on the source region 19, a source electrode 20 is formed from aluminum wiring in a first via hole Via1, to constitute a source S.

On the right side of the p-well region 12 in the p-type Si substrate 11 in FIG. 1, a diffused capacitor electrode 21 is formed by ion implantation. The diffused capacitor electrode 21 is electrically isolated pixel by pixel with the use of the left and right field oxide films 13B and 13C. A range from the field oxide film 13A to the field oxide film 13C corresponds to a pixel.

On the diffused capacitor electrode 21, an insulating film 22 and a capacitor electrode 23 are formed in this order. On the capacitor electrode 23, a capacitor electrode contact 24 is formed from aluminum wiring in a first via hole Via1, to constitute a storage capacitor C for the MOSFET 14.

Over the field oxide films 13A to 13C, gate electrode 16, and capacitor electrode 23, functional films including a first interlayer insulating film 25, a first metal film 26, a second interlayer insulating film 27, a second metal film 28, a third interlayer insulating film 29, and a third metal film 30 are formed one upon another in this order.

The first, second and third interlayer insulating films 25, 27, and 29 are formed from, for example, $SiO_2$ (silicon oxide) having an insulating ability.

The first, second, and third metal films 26, 28, and 30 are made of, for example, conductive aluminum wiring and are segmented into predetermined patterns corresponding to pixels, i.e., the switching elements 14, respectively. Within one pixel, the first, second, and third metal films 26, 28, and 30 are electrically connected to each other. The first, second, and third metal films 26, 28, and 30 in a given pixel are electrically isolated from those in any adjacent pixel with openings 26a, 28a, and 30a formed in the metal films 26, 28, and 30 between adjacent pixels.

In each pixel, the lowermost first metal film 26 is connected to the corresponding switching element 14 and storage capacitor C through the drain electrode 18, source electrode 20, and capacitor electrode contact 24 that are formed from aluminum wiring filled in the first via holes Via1 etched in the first interlayer insulating film 25.

In each pixel, the intermediate second metal film 28 serves as a light blocking metal film to block part of read light L made incident to an upper transparent substrate 42 (to be explained later) from reaching the MOSFET 14 formed under the metal film 28 on the p-type Si substrate 11. Namely, the second metal film (light blocking metal film) 28 is formed to cover an opening 30a formed between adjacent metal films 30 formed over the film 28 and block part of read light L entering the opening 30a. The second metal film 28 is connected to the lowermost first metal film 26 through the aluminum wiring filled in the second via hole Via2 etched in the second interlayer insulating film 27. In some embodiments, as shown in FIGS. 4 and 12, the light blocking metal film 28 is divided into a first portion 91 and a second portion 92 by an annular-type opening 28*a*, which is bound on its interior edge by the first portion 91 and is in turn bound on its exterior edge by the second portion 92. Opening 28*a* thus electrically isolates the first portion 91 from the second portion 92.

In each pixel, the top third metal film 30 is formed as a square reflective pixel electrode for the pixel. The metal film 30 is separated from any adjacent one by the opening 30*a* formed between them and is connected to the intermediate second metal film 28 through aluminum wiring filled in a third via hole Via3 etched in the third interlayer insulating film 29.

On the third metal film (hereinafter referred to as reflective pixel electrode) 30, liquid crystals 40 are sealed. On the liquid crystals 40, a transparent counter electrode 41 is formed on the reverse of the transparent substrate (glass substrate) 42, to face the reflective pixel electrodes 30. The counter electrode 41 serves as a common electrode for the reflective pixel electrodes 30, and therefore, is not segmented into pixels. The counter electrode 41 is made of, for example, ITO (indium tin oxide).

The active-matrix drive circuit to drive a matrix of the MOSFETs (switching elements) 14 arranged on the p-type Si substrate 11 in the reflective LCD 10A according to the related art 1 will be explained with reference to FIGS. 2A and 2B.

In FIGS. 2A and 2B, the active-matrix drive circuit 70 of the reflective LCD 10A drives a matrix of the MOSFETs (switching elements) 14 arranged on the p-type Si substrate (semiconductor substrate) 11. A set of the MOSFET 14, reflective pixel electrode 30 connected to the MOSFET 14, and storage capacitor C for the MOSFET 14 forms a pixel, and a set of such pixels is arranged in a matrix on the p-type Si substrate 11.

To specify one of the pixels, a horizontal shift register circuit 71 and a vertical shift register circuit 75 are arranged in column and row directions, respectively.

For each column of pixels, the horizontal shift register circuit 71 has a video switch 72 and a signal line 73 vertically extended from the video switch 72. For the sake of convenience, FIG. 2A shows only one signal line 73 connected to the horizontal shift register circuit 71. Between the horizontal shift register 71 and the video switch 72, the signal line 73 is connected to a video line 74. The signal line 73 is also connected to the drain electrodes 18 of the MOSFETs 14 that are in the column for which the signal line 73 is provided.

For each row of pixels, the vertical shift register circuit 75 has a gate line 76 horizontally extended. For the sake of convenience, FIG. 2A shows only one gate line 76 extended from the horizontal shift register circuit 75. The gate line 76 is connected to the gate electrodes 16 of the MOSFETs that are in the row for which the gate line 76 is provided.

The source electrode 20 of each MOSFET 14 is connected to corresponding one of the reflective pixel electrodes 30 and corresponding one of the storage capacitors C, more precisely, the capacitor electrode contact 24 and capacitor electrode 23 of the storage capacitor C. The active-matrix drive circuit 70 employs a known inversion driving method that inverts the polarity of video signals between positive and negative frame by frame. For example, video signals to be written in an "n"th frame are provided with positive polarity and those to be written in an "n+1"th frame are provided with negative polarity. To supply a video signal through the signal line 73, the signal line 73 must be connected to one of the drain electrode 18 and source electrode 20 of the MOSFET 14. In this example, the signal line 73 is connected to the drain electrode 18 as mentioned above. If the signal line 73 is connected to the source electrode 20, the drain electrode 18 is connected to the reflective pixel electrode 30 and the capacitor electrode contact 24 and capacitor electrode 23 of the storage capacitor C.

In the reflective LCD 10A according to the related art 1, a fixed well potential is supplied to the MOSFET 14, and a fixed common potential COM is supplied to the storage capacitor C.

The well potential to the MOSFET 14 is fixed to, for example, 15 V and is supplied between the gate line 76 and a well potential contact on a p+region (not shown) formed in the p-well region 12 (FIG. 1). If an n-type Si substrate is employed, the well potential is, for example, 0 V.

The common potential COM to the storage capacitor C is fixed to, for example, 8.5 V and is supplied between the capacitor electrode 23 of the storage capacitor C and a common potential contact (not shown) on the diffused capacitor electrode 21. The common potential COM can basically be of any voltage to form the storage capacitor C. It may be set to a center value (for example, 8.5 V) of video signals, to make the voltage applied to the storage capacitor C about half a source voltage. Namely, a storage capacitor withstand voltage is about half a source voltage. It is possible, therefore, to thin the film thickness of only the insulating film 22 of the storage capacitor C, to increase a capacitance value. Larger the storage capacitance value of the storage capacitor C, the smaller a potential change the reflective pixel electrode 30 receives. This is advantageous in preventing flickering and burning.

The storage capacitor C stores charge in accordance with a potential difference between a potential applied to the reflective pixel electrode 30 and the common potential COM, keeps the stored voltage during an unselected period or OFF period of the MOSFET 14, and continuously applies the stored voltage to the reflective pixel electrode 30.

To drive a pixel, the active-matrix drive circuit 70 of the reflective LCD 10A according to the related art sequentially supplies video signals to the video line 74 at shifted timing. One of the video signals is supplied to the columnar signal line 73 through the video switch 72. At this time, a MOSFET 14 located at an intersection of the signal line 73 and a selected gate line 76 is turned on.

The video signal is supplied to the reflective pixel electrode 30 of the selected MOSFET 14 through the signal line 73 and is written as charge into the storage capacitor C. This results in causing a potential difference between the selected reflective pixel electrode 30 and the counter electrode 41 (FIG. 1) according to the video signal and modulates the optical characteristic of the liquid crystals 40. As a result, color-image read light L (FIG. 1) emitted to the transparent substrate 42 is modulated by the liquid crystals 40 pixel by pixel, is reflected by the reflective pixel electrodes 30, and is emitted from the transparent substrate 42. Unlike the transmission LCD, the reflective LCD can utilize read light L (FIG. 1) nearly 100% to provide high-resolution, high-luminance projection images.

At this time, as shown in FIG. 1, part of the color-image read light L entering the transparent substrate 42 penetrates the third interlayer insulating film 29 through the openings 30*a* formed between adjacent reflective pixel electrodes 30. The penetrated light is repeatedly reflected in the third interlayer insulating film 29 between the reverses of the reflective pixel electrodes (third metal films) 30 made of aluminum wiring and the surfaces of the light blocking metal films (second metal films) 28 made of aluminum wiring. Thereafter, the repeatedly reflected light penetrates the second interlayer insulating film 27 through the openings 28a where no light blocking metal film 28 is formed. In the second interlayer insulating film 27, the light is repeatedly reflected between the reverses of the light blocking metal films 28 made of aluminum wiring and the surfaces of the first metal films 26 made of aluminum wiring. Thereafter, the repeatedly reflected light penetrates the first interlayer insulating film 25 through the openings 26a where no first metal film 26 is formed. Each opening 26a where no first metal film 26 is formed is located above the gate electrode 16 of the MOSFET 14 or the capacitor electrode 23 of the storage capacitor C, so that the part of the read light L penetrated the first interlayer insulating film 25 reaches the gate electrode 16, drain region 17, and source region 19 of the MOSFET 14 or the capacitor electrode 23 of the storage capacitor C.

If part of the read light L penetrates the drain region 17 and source region 19 of the MOSFET 14, a photodiode function works because there are pn junctions between the p-well region 12 and the drain region 17 and source region 19 that are made of high-concentration n+impurity layers in the MOSFET 14. As a result, the part of the read light L generates photocarriers to cause a leak current, which may vary the potential of the reflective pixel electrode 30. The variation in the potential of the reflective pixel electrode 30 may cause flickering and burning. It is necessary, therefore, to minimize light leakage to the MOSFET 14 caused by part of the read light L.

An LCD employing a technique of suppressing light leakage to a MOSFET due to part of read light L is disclosed in, for example, Japanese Unexamined Patent Application Publication No.2002-40482.

FIG. 3 is a sectional view schematically showing an LCD according to a related art 2.

The LCD 100 according to the related art 2 of FIG. 3 is the one disclosed in the above-mentioned publication No.2002-40482. With reference to the publication, the LCD 100 will briefly be explained.

In FIG. 3, the LCD 100 according to the related art 2 employs a first substrate (drive circuit substrate) 101 on which a plurality of active elements 102 are formed. Each active element 102 consists of a gate electrode 103, a drain region 104, and a source region 105. The drain and source regions 104 and 105 are formed on the left and right sides of the gate electrode 103, respectively. The active element 102 is electrically isolated from adjacent active elements 102 by left and right field oxide films 107 that are continuous to an insulating film 106.

On the active element 102, functional films including a first interlayer film 108, a first conductive film 109, a second interlayer film 110, a first light blocking film 111, a third interlayer film 112, a second light blocking film 113, a fourth interlayer film 114, and a second conductive film (hereinafter referred to as reflective electrode) 115 serving as a reflective electrode are formed one upon another in this order.

The first conductive film 109, first light blocking film 111, second light blocking film 113, and reflective electrode 115 are conductive and are sectioned into predetermined patterns to serve for the active elements 102, respectively.

The first conductive film 109 is connected to the drain region 104 and source region 105 of the active element 102 through first via holes Via1 formed in the first interlayer film 108. The first light blocking film 111 must be provided with a second via hole Via2 indicated with an imaginary line outside FIG. 3, to apply a voltage thereto. The second light blocking film 113 is connected to the first conductive film 109 through a third via hole Via3 formed in the second and third interlayer films 110 and 112. The reflective electrode 115 is connected to the second light blocking film 113 through a fourth via hole Via4 formed in the fourth interlayer film 114. Accordingly, the reflective electrode 115 is connected to the corresponding active element 102 through the second light blocking film 113 and first conductive film 109.

On the reflective electrodes (second conductive films) 115, an aligning film 116, a liquid crystal composition 117, an aligning film 118, a counter electrode 119, and a second substrate (transparent substrate) 120 are formed in this order. The liquid crystal composition 117 is partitioned by left and right spacers 121 for each reflective electrode 115 (pixel).

The spacer 121 is positioned on an opening 115a formed between adjacent reflective electrodes 115. The second light blocking film 113 has substantially the same size as the reflective electrode 115 and is formed to cover the opening 115a. The first light blocking film 111 is formed to cover an opening 113a formed between adjacent second light blocking films 113. Part of read light L made incident to the second substrate (transparent substrate) 120 may penetrate the fourth interlayer film 114 through the opening 115a formed between adjacent reflective electrodes 115. The penetrated light is blocked by the first and second light blocking films 111 and 113, so that the light may not reach the active elements 102 formed on the first substrate 101. In this way, this disclosure suppresses light leakage to the active elements 102 due to the penetration of part of read light L.

According to the LCD 100 of the related art 2, a voltage is applied to the first light blocking film 111, and the first light blocking film 111, third interlayer film 112, and second light blocking film 113 form a capacitor. When a voltage applied to the reflective electrode 115 is changed relative to the potential of the counter electrode 119, the reflective electrode 115, liquid crystal composition 117, and counter electrode 119 form a first capacitor, and the first light blocking film 111, third interlayer film 112, and second light blocking film 113 form the second capacitor mentioned above.

This configuration prevents unnecessary light incident to the liquid crystal display elements and realizes a high-quality LCD and a liquid-crystal projector employing the LCD, as stated in the disclosure.

According to the reflective LCD 10A of the related art 1 of FIG. 1, part of color-image read light L made incident to the transparent substrate 42 reaches the MOSFETs 14 formed on the p-type Si substrate 11. Namely, light leakage occurs.

According to the reflective LCD 100 of the related art 2 of FIG. 3, the second light blocking film 113 is formed under the reflective electrodes 115, to cover the opening 115a formed between the adjacent reflective electrodes 115. In addition, the first light blocking film 111 is formed under the second light blocking films 113, to cover the opening 113a formed between the adjacent light blocking films 113. This arrangement prevents part of read light L made incident to the second substrate (transparent substrate) 120 from reaching the active elements 102 formed on the first substrate 101. Namely, no light leakage occurs. However, when forming, over the first substrate 101, the first conductive film 109, second interlayer film 110, first light blocking film 111, third interlayer film 112, second light blocking film 113, fourth interlayer film 114, and reflective electrode (second conductive film) 115 in this order, a process of forming the first via holes Via1 for the first conductive film 109, a process of forming the second via holes Via2 for the first light blocking film 111, a process of forming the third via holes Via3 for the second light blocking film 113, and a process of forming the fourth via holes Via4 for the reflective electrode (second conductive film) 115 must be carried out. The increased number of the via hole forming processes elongates the manufacturing time of the LCD 100 and deteriorates the yield thereof.

SUMMARY OF THE INVENTION

An object of the present invention is to provide a reflective LCD that minimizes light leakage to switching elements due to part of read light L made incident to a transparent substrate with the use of at least two layers of light blocking metal films that are formed one upon another between a semiconductor substrate and a reflective pixel electrode with an insulating film being laid on and under each layer of the light blocking metal films. The number of via-hole forming processes needed for the reflective LCD is smaller than that of the related art 2 by one. The thickness of the light blocking insulating film formed between the two light blocking metal films is set to be appropriate for color-image read light. Each switching element formed on the semiconductor substrate of the reflective LCD can have an increased storage capacitance value.

In order to accomplish the object, a first aspect of the present invention provides a reflective LCD having a semiconductor substrate, a plurality of switching elements formed on the semiconductor substrate and electrically isolated from one another, a plurality of functional films formed one upon another over the switching elements, a plurality of reflective pixel electrodes formed on a top one of the functional films and electrically isolated from one another to correspond to the switching elements, respectively, storage capacitors provided for the switching elements, each switching element, each reflective pixel electrode connected to the switching element, and each storage capacitor for the switching element constituting a pixel, pixels being arranged in a matrix on the semiconductor substrate, a transparent substrate, a transparent counter electrode formed on a reverse of the transparent substrate to face the reflective pixel electrodes, and liquid crystals sealed between the reflective pixel electrodes and the counter electrode.

The reflective LCD of the first aspect includes at least two layers of light blocking metal films that are formed one upon another between the semiconductor substrate and the reflective pixel electrodes with an insulating film being laid on and under each layer of the light blocking metal films, to block part of read light, which has been made incident from the transparent substrate side to the liquid crystals through the counter electrode and has penetrated the insulating film adjacent to the reflective pixel electrodes through openings formed between adjacent ones of the reflective pixel electrodes, from reaching the switching elements. Any one layer of the light blocking metal films covers the openings formed between adjacent ones of the reflective pixel electrodes. The light blocking metal films in each layer are electrically isolated from one another pixel by pixel. Each light blocking metal film in each layer is electrically connected, through via holes, to each corresponding one of the switching elements, reflective pixel electrodes, and storage capacitors.

According to the first aspect, part of read light made incident from the transparent substrate side through the counter electrode to the liquid crystals and penetrated the insulating film adjacent to the reflective pixel electrodes through the openings formed between adjacent reflective pixel electrodes is blocked by the at least two light blocking metal films from reaching the switching elements. The light blocking metal films are formed one upon another between the semiconductor substrate and the reflective pixel electrodes with the insulating film being laid on and under each of the light blocking metal films. Any one layer of the light blocking metal films covers the openings formed between adjacent reflective pixel electrodes. The light blocking metal films in each layer are electrically isolated from one another pixel by pixel. Each light blocking metal film in each layer is electrically connected, through via holes, to each corresponding one of the switching elements, reflective pixel electrodes, and storage capacitors. As a result, the number of via-hole forming processes is smaller than that of the related art 2 by one. Namely, the number of via-hole forming processes of the first aspect is within three for forming first to third via holes.

Based on the reflective LCD of the first aspect, a second aspect of the present invention makes a storage capacitance value of the storage capacitor in each pixel equal to the sum of a storage capacitance value of a storage capacitor consisting of a diffused capacitor electrode, an insulating film, a capacitor electrode, and a capacitor electrode contact formed on the semiconductor substrate and a storage capacitance value of a storage capacitor consisting of the two layers of the light blocking metal films and the light blocking insulating film formed between the two layers of the light blocking metal films.

According to the second aspect, a storage capacitance value of the storage capacitor in each pixel of the first aspect is the sum of a storage capacitance value of a storage capacitor consisting of a diffused capacitor electrode, an insulating film, a capacitor electrode, and a capacitor electrode contact formed on the semiconductor substrate and a storage capacitance value of a storage capacitor consisting of the two layers of the light blocking metal films and the light blocking insulating film formed between the two layers of the light blocking metal films. The second aspect increases a total storage capacitance value, suppresses variation in potential of the reflective pixel electrodes, and prevents flickering and burning.

Based on the reflective LCD of the first aspect, a third aspect of the present invention forms at least one of the two layers of the light blocking metal films from TiN, Ti, or layered TiN/Ti.

According to the third aspect, at least one of the two layers of the light blocking metal films is made of TiN, Ti, or layered TiN/Ti. The third aspect reduces the reflectance of the light blocking metal films to absorb part of read light. Namely, the third aspect can absorb part of read light entering the openings formed between adjacent reflective pixel electrodes.

A fourth aspect of the present invention provides a reflective LCD having a semiconductor substrate, a plurality of switching elements formed on the semiconductor substrate and electrically isolated from one another, a plurality of functional films formed one upon another over the switching elements, a plurality of reflective pixel electrodes formed on a top one of the functional films and electrically isolated from one another to correspond to the switching elements, respectively, storage capacitors provided for the switching elements, each switching element, each reflective pixel electrode connected to the switching element, and each storage capacitor for the switching element constituting a pixel, pixels being arranged in a matrix on the semiconductor substrate, a transparent substrate, a transparent counter electrode formed on a reverse of the transparent substrate to face the reflective pixel electrodes, and liquid crystals sealed between the reflective pixel electrodes and the counter electrode.

The reflective LCD of the fourth aspect includes at least two layers of light blocking metal films that are formed one upon another between the semiconductor substrate and the reflective pixel electrodes with an insulating film being laid on and under each layer of the light blocking metal films, to block part of color-image read light, which has been made incident from the transparent substrate side to the liquid crystals through the counter electrode and has penetrated the insulating film adjacent to the reflective pixel electrodes through openings formed between adjacent ones of the reflective pixel electrodes, from reaching the switching elements. The insulating film laid between the two layers of the light blocking metal films is a light blocking insulating film whose thickness is set to be equal to or thinner than 400 nm which is the wavelength of B (blue) light contained in the color-image read light.

According to the fourth aspect, part of color-image read light made incident from the transparent substrate side through the counter electrode to the liquid crystals and penetrated the insulating film adjacent to the reflective pixel electrodes through the openings formed between adjacent reflective pixel electrodes is blocked by the at least two light blocking metal films from reaching the switching elements. The light blocking metal films are formed one upon another between the semiconductor substrate and the reflective pixel electrodes with an insulating film being laid on and under each of the light blocking metal films. The insulating film laid between the two layers of the light blocking metal films is a light blocking insulating film. The thickness of the light blocking insulating film is set to be equal to or thinner than 400 nm which is the wavelength of B (blue) light contained in the color-image read light. Since it is not necessary to use light having wavelengths equal to or shorter than 400 nm that is the wavelength of B (blue) light contained in color-image read light, the fourth aspect can improve the light blocking effect of the light blocking insulating film.

A fifth aspect of the present invention provides a reflective LCD having a semiconductor substrate, a plurality of switching elements formed on the semiconductor substrate and electrically isolated from one another, a plurality of functional films formed one upon another over the switching elements, a plurality of reflective pixel electrodes formed on a top one of the functional films and electrically isolated from one another to correspond to the switching elements, respectively, storage capacitors provided for the switching elements, each switching element, each reflective pixel electrode connected to the switching element, and each storage capacitor for the switching element constituting a pixel, pixels being arranged in a matrix on the semiconductor substrate, a transparent substrate, a transparent counter electrode formed on a reverse of the transparent substrate to face the reflective pixel electrodes, and liquid crystals sealed between the reflective pixel electrodes and the counter electrode.

The reflective LCD of the fifth aspect includes at least two layers of light blocking metal films that are formed one upon another between the semiconductor substrate and the reflective pixel electrodes with an insulating film being laid on and under each layer of the light blocking metal films, to block part of color-image read light, which has been made incident from the transparent substrate side to the liquid crystals through the counter electrode and has penetrated the insulating film adjacent to the reflective pixel electrodes through openings formed between adjacent ones of the reflective pixel electrodes, from reaching the switching elements. The insulating film laid between the two layers of the light blocking metal films is a light blocking insulating film made of SiN or SiON.

According to the fifth aspect, part of color-image read light made incident from the transparent substrate side through the counter electrode to the liquid crystals and penetrated the insulating film adjacent to the reflective pixel electrodes through the openings formed between adjacent reflective pixel electrodes is blocked by the at least two light blocking metal films from reaching the switching elements. The light blocking metal films are formed one upon another between the semiconductor substrate and the reflective pixel electrodes with an insulating film being laid on and under each of the light blocking metal films. The insulating film laid between the two layers of the light blocking metal films is a light blocking insulating film made of SiN or SiON. Part of read light entering the openings formed between adjacent reflective pixel electrodes is blocked by the SiN or SiON film having a low reflectance. At the same time, the light blocking insulating film of SiN or SiON formed between the two layers of the light blocking metal films has a high dielectric constant, and together with the two layers of the light blocking metal films, forms a storage capacitor having a large storage capacitance value. Further, the combination of the light blocking insulating film made of SiN or SiON having a high refractive index and the light blocking metal films having light absorbability can improve the light blocking effect.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a sectional view schematically showing an LCD according to the related art 2;

FIGS. 5A and 5B are enlarged sectional views explaining a third via hole for electrically connecting a first light blocking metal film (second metal film), second light blocking metal film, and reflective pixel electrode (third metal film) shown in FIG. 4 to one another, in which FIG. 5A shows the third via hole filled with tungsten and FIG. 5B the third via hole filled with aluminum wiring;

FIG. 6 is a plan view showing the reflective pixel electrode (third metal film), second light blocking metal film, and third via hole shown in FIG. 4;

FIGS. 7A and 7B are sectional views explaining the formation of a storage capacitor provided for a switching element in the reflective LCD according to the first embodiment of the present invention, in which FIG. 7A shows the related art 1 as a comparison example and FIG. 7B the present invention;

FIGS. 9A to 9G are sectional views showing the first to seventh processes of a method for manufacturing the reflective LCD according to the first embodiment of the present invention;

FIG. 10 is an enlarged sectional view schematically showing a pixel in a reflective LCD according to a second embodiment of the present invention.

DETAILED DESCRIPTION OF EMBODIMENTS

Reflective LCDs according to first to third embodiments of the present invention will be explained in detail with reference to FIGS. 4 to 11.

First Embodiment

Figure 4:
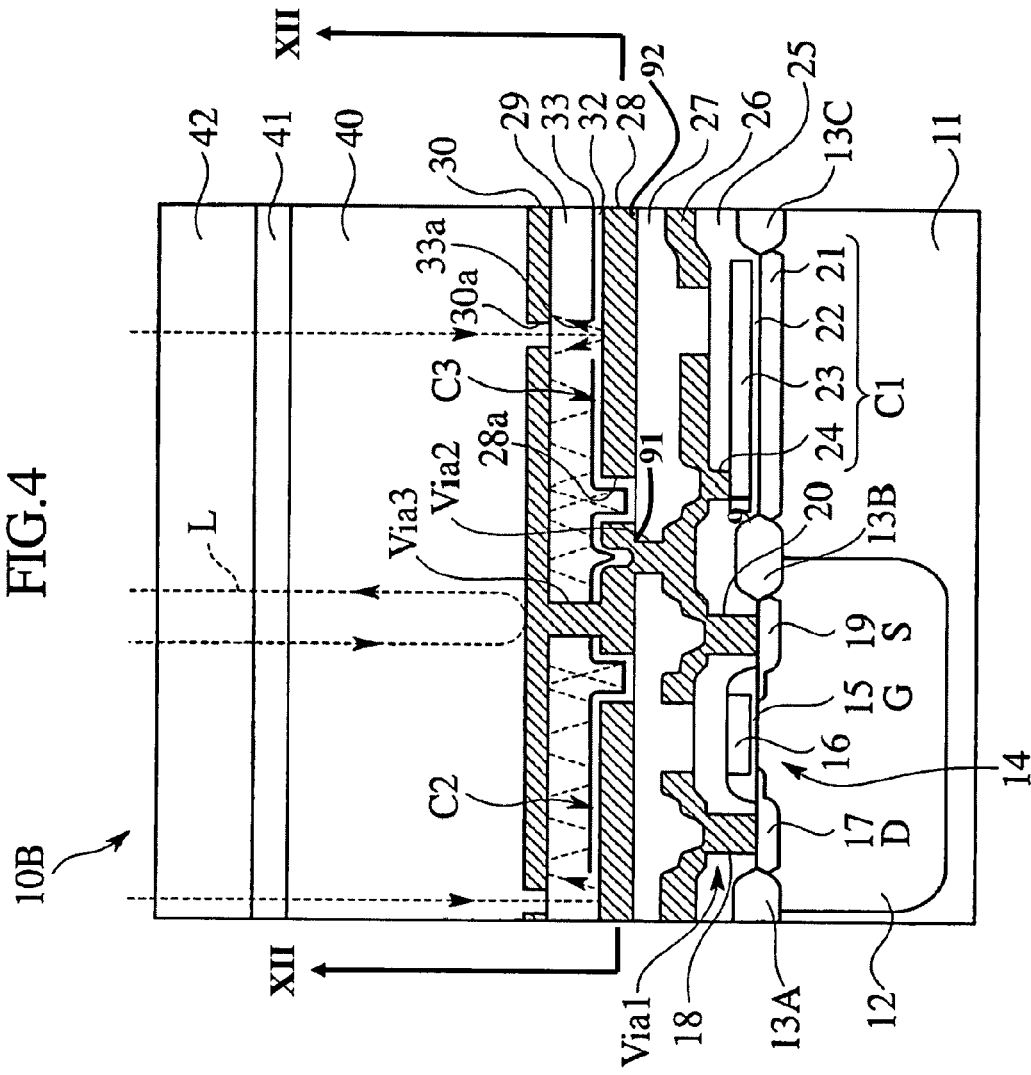
FIG. 4 is an enlarged sectional view schematically showing a pixel in a reflective LCD according to a first embodiment of the present invention.
Figure 5A:
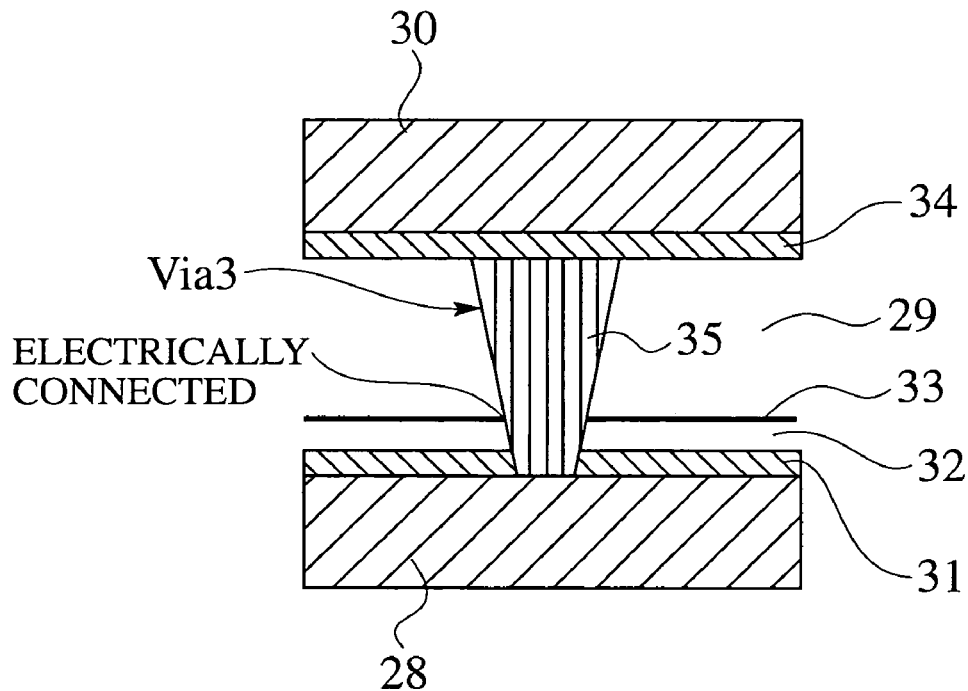
Figure 5B:
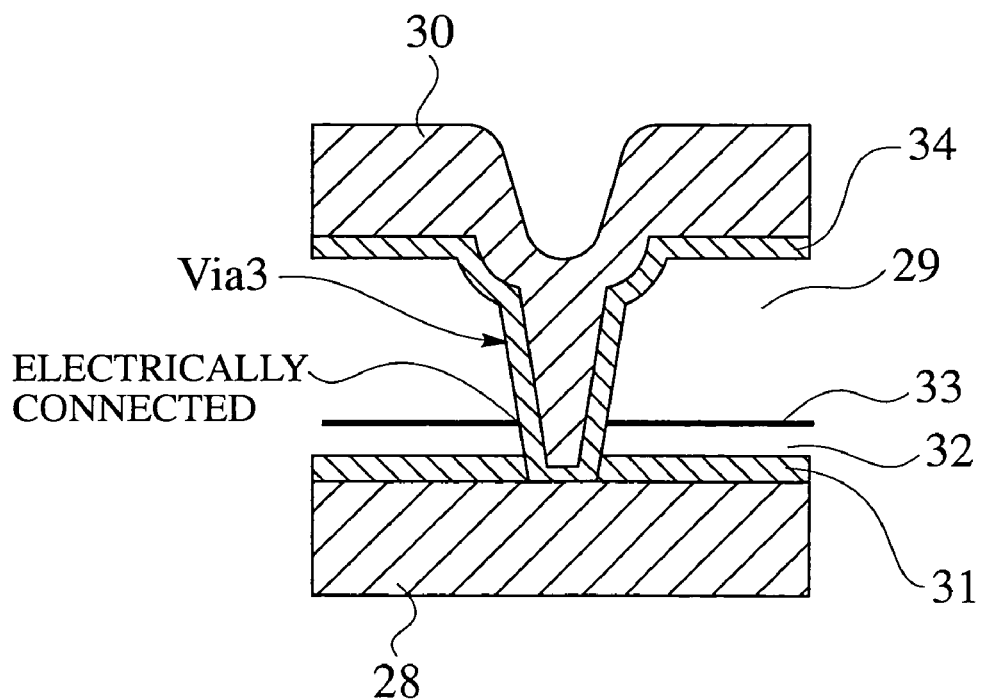
Figure 7A:
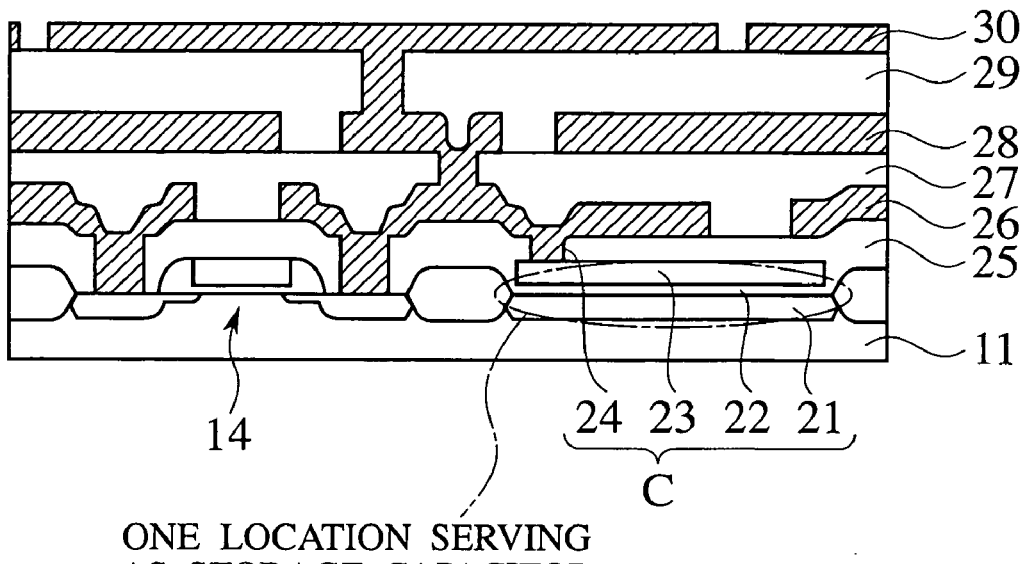
Figure 7B:
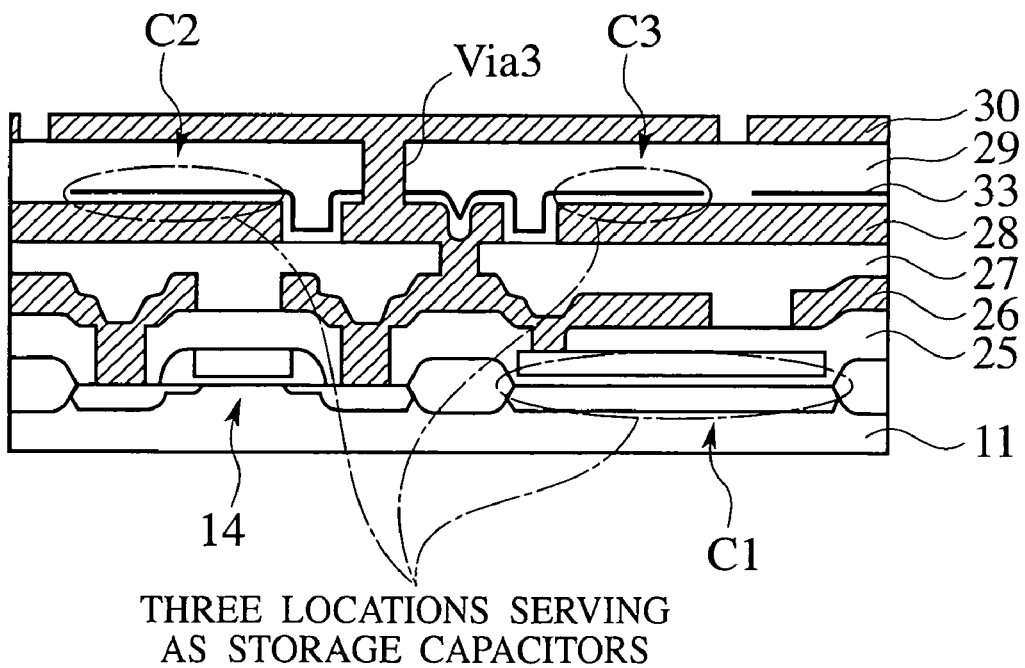
Figure 8:
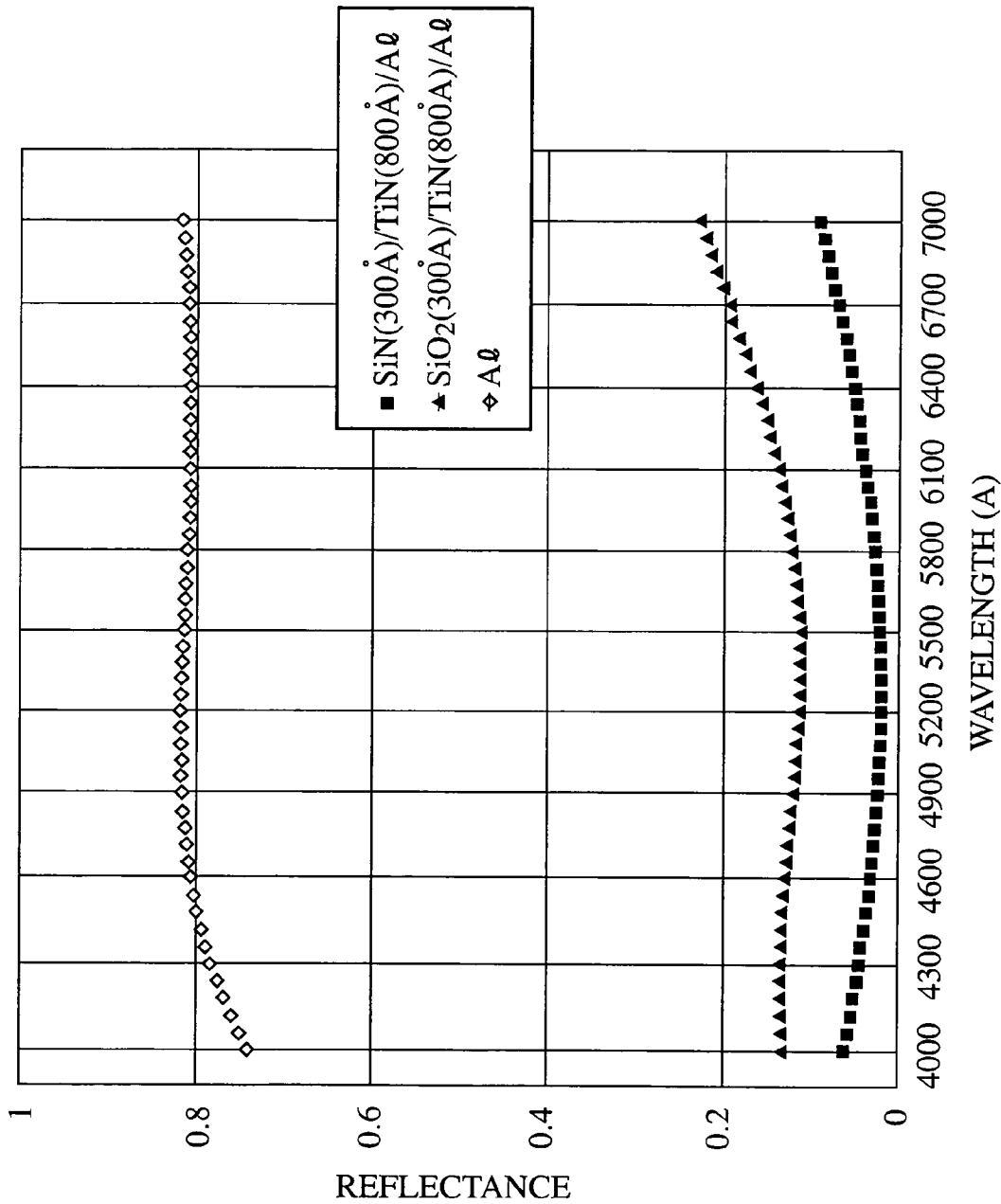
FIG. 8 explains the reflectance of a light blocking insulating film formed on a first light blocking metal film (second metal film)/antireflection film in the reflective LCD according to the first embodiment of the present invention.

FIG. 4 is an enlarged sectional view schematically showing a pixel in a reflective LCD according to the first embodiment of the present invention. FIGS. 5A and 5B are enlarged sectional views explaining a third via hole for electrically connecting a first light blocking metal film (second metal film), second light blocking metal film, and reflective pixel electrode (third metal film) shown in FIG. 4 to one another, in which FIG. 5A shows the third via hole filled with tungsten and FIG. 5B the third via hole filled with aluminum wiring. FIG. 6 is a plan view showing the reflective pixel electrode (third metal film), second light blocking metal film, and third via hole shown in FIG. 4. FIGS. 7A and 7B are sectional views explaining the formation of a storage capacitor provided for a switching element in the reflective LCD according to the first embodiment of the present invention, in which FIG. 7A shows the related art 1 as a comparison example and FIG. 7B the present invention. FIG. 8 explains reflectance on a light blocking insulating film formed on a first light blocking metal film (second metal film)/antireflection film in the reflective LCD according to the first embodiment of the present invention.

Figure 1:
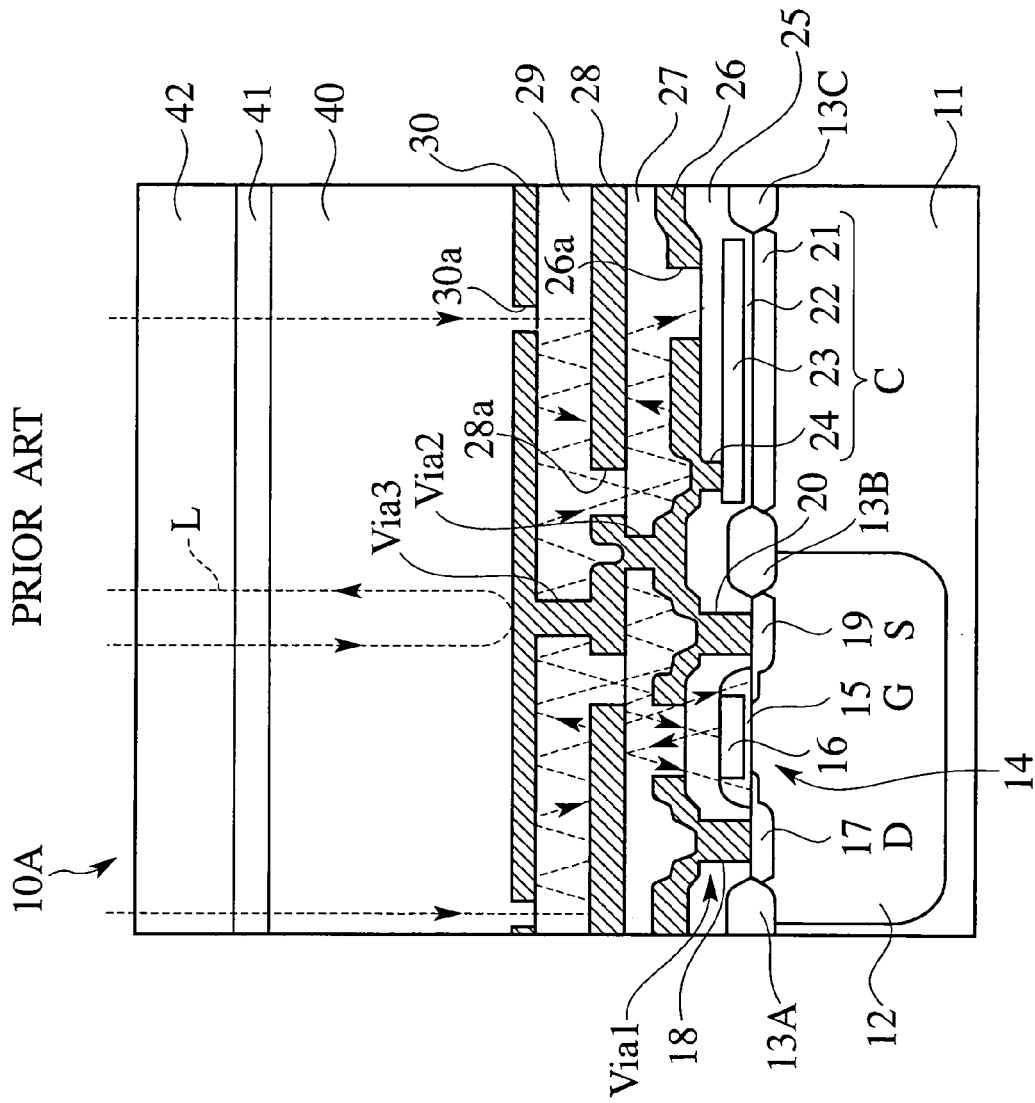
FIG. 1 is an enlarged sectional view schematically showing a pixel in a reflective LCD according to the related art 1.

The structure of the reflective LCD 10B of FIG. 4 according to the first embodiment of the present invention is based on the structure of the reflective LCD 10A of the related art 1 explained with reference to FIG. 1 with the technical idea of light leakage prevention of the LCD 100 of the related art 2 explained with reference to FIG. 3 being partly applied to the structure of FIG. 1. Even if at least two layers of light blocking metal films are formed between a semiconductor substrate and reflective pixel electrodes with an insulating film being laid on and under each layer of the light blocking metal films, the embodiment of the present invention can reduce the number of via-hole forming processes smaller than that of the related art 2 by one, can set the thickness of the light blocking insulating film formed between the two layers of the light blocking metal films so as to provide a proper characteristic for color-image read light, and can increase a storage capacitance value for each switching element formed on the semiconductor substrate.

For convenience of explanation, components of the embodiment that are the same as those of the reflective LCD 10A of the related art 1 explained above are represented with like reference numerals and will be explained only when needed. Components of the embodiment that are different from those of the related art 1 are represented with new reference numerals, and the differences from the related art will mainly be explained.

In FIG. 4, the reflective LCD 10B according to the first embodiment of the present invention has a plurality of pixels to display images. Among the pixels, one will be enlarged and explained. A semiconductor substrate 11 serving as a base is a p-type Si substrate (or an n-type Si substrate) like that of the reflective LCD 10A according to the related art 1 explained with reference to FIG. 1. In the semiconductor substrate (hereinafter referred to as p-type Si substrate) 11, a p-well region 12 is formed and is electrically isolated from those in adjacent pixels by left and right field oxide films 13A and 13B. The p-well region 12 includes a switching element 14, which is a low-voltage-driven-type MOSFET. The switching element (hereinafter referred to as MOSFET) 14 has a gate G consisting of a gate oxide film 15 and a gate electrode 16 formed on the gate oxide film 15, a drain D consisting of a drain region 17 and a drain electrode 18 formed on the drain region 17, and a source S consisting of a source region 19 and a source electrode 20 formed on the source region 19. The MOSFET 14 is so formed as to be driven at a low voltage of about 7 V.

On the right side of the p-well region 12 on the p-type Si substrate 11, a storage capacitor C1 is formed. The storage capacitor C1 consists of a diffused capacitor electrode 21, an insulating film 22, a capacitor electrode 23, and a capacitor electrode contact 24. The storage capacitor C1 is electrically isolated from those for adjacent pixels by the left and right field oxide films 13B and 13C.

Over the field oxide films 13A to 13C, gate electrode 16, and capacitor electrode 23, a plurality of functional films are formed one upon another. A top one of the functional films includes reflective pixel electrodes 30 that correspond to the MOSFETs 14, respectively, and are electrically isolated from one another pixel by pixel. Among the functional films, a first interlayer insulating film 25, a first metal film 26, a second interlayer insulating film 27, and a second metal film 28 are formed like those of the related art 1. The first metal film 26 is made of an aluminum wiring film and is connected to the corresponding switching element 14 and storage capacitor C1 through the drain electrode 18, source electrode 20, and capacitor electrode contact 24. The electrodes 18 and 20 and contact 24 are made of aluminum wiring filled in first via holes Via1. The second metal film 28 is electrically isolated from an adjacent second metal film 28 by an opening 28a formed between the adjacent second metal films 28 and is connected to the first metal film 26 through aluminum wiring in a second via hole Via2, like the related art 1.

The differences from the related art 1 will be explained. The second metal film 28 serves as a first light blocking metal film to cover an opening 30a formed between adjacent reflective pixel electrodes 30 and block part of color-image read light L that enters the opening 30a and advances toward the p-type Si substrate 11.

As shown in the enlarged views of FIGS. 5A and 5B, a second light blocking metal film 33 is formed over the second metal film (hereinafter referred to as first light blocking metal film) 28 with an antireflection film 31 and a light blocking insulating film 32 having a predetermined film thickness (400 nm or below) being interposed between the films 28 and 33. The second light blocking metal film 33 covers the opening 28a (FIG. 4) formed between adjacent first light blocking metal films 28.

On the second light blocking metal film 33, a third interlayer insulating film 29 is formed, and on the third interlayer insulating film 29, an antireflection film 34 is formed. On the antireflection film 34, the reflective pixel electrodes (third metal films) 30 are formed. For convenience of viewing the drawings, the antireflection films 31 and 34 are not shown in FIG. 4 and are shown in enlarged views in FIGS. 5A and 5B.

The antireflection film 31 formed on the surface of each first light blocking metal film (second metal film) 28 and the antireflection film 34 formed on the reverse of each reflective pixel electrode (third metal film) 30 are made of conductive TiN (titanium nitride) to prevent reflection of part of color-image read light L that penetrates the third interlayer insulating film 29 through the opening 30a (FIG. 4) formed between adjacent reflective pixel electrodes 30.

The light blocking insulating film 32 is an essential part of the present invention and is usually formed from an oxide film such as an $SiO_2$ (silicon oxide) film on the first light blocking metal film (second metal film) 28/antireflection film 31. Instead of $SiO_2$, SiN (silicon nitride) or SiON (silicon oxide nitride) having a larger dielectric constant than $SiO_2$ may be used to form the light blocking insulating film 32.

The thickness of the light blocking insulating film 32 is preferably 400 nm or thinner, more preferably, about 300 nm. The reason of this is because the reflective LCD 10B reflects, by the reflective pixel electrodes 30, color-image read light L having wavelengths of 400 nm to 700 nm in a visible light range. Accordingly, there is no need of light having a B (blue) light wavelength of 400 nm or shorter in the color-image read light L. Namely, it is not necessary to make light having a wavelength of 400 nm or shorter into the transparent substrate 42.

For this reason, the thickness of the light blocking insulating film 32 is set to be equal to or thinner than the B (blue) light wavelength of 400 nm in color-image read light L, so that part of the color-image read light L penetrated the light blocking insulating film 32 through the openings 33a formed between adjacent second light blocking metal films 33 is absorbed and reflected by the first and second light blocking metal films 28 and 33 formed on and under the light blocking insulating film 32. This results in further improving the light blocking effect of the light blocking insulating film 32.

The light blocking insulating film 32 is formed by chemical vapor deposition (CVD), and therefore, involves little in-plane variations on a wafer as is known. Accordingly, the thickness of the light blocking insulating film 32 formed between the first and second light blocking metal films 28 and 33 can relatively uniformly be set to 400 nm or thinner. This results in reducing variation in the light blocking effect of the light blocking insulating film 32.

The second light blocking metal film 33 formed on the light blocking insulating film 32 is also an essential part of the present invention. It is important to form the second light blocking metal film 33 from metal having a low reflectance so that it may absorb part of color-image read light L penetrated the third interlayer insulating film 29 through the openings 30a between adjacent reflective pixel electrodes 30. More precisely, the second light blocking metal film 33 is formed from TiN (titanium nitride), Ti (titanium), or TiN/Ti (layered TiN and Ti) to a thickness in the range of 50 nm to 200 nm. As a result, the reflectance of the second light blocking metal film 33 can be set to a low value to absorb part of read light L entering the openings 30a formed between adjacent reflective pixel electrodes 30.

In each pixel, the reflective pixel electrode (third metal film) 30 is connected to the corresponding first light blocking metal film (second metal film) 28 formed under the reflective pixel electrode 30 through a third via hole Via3. When forming this third via hole Via3, the second light blocking metal film 33 is made of light absorbing metal for which an etching process is executable when etching the third interlayer insulating film 29. As a result, even if the second and first light blocking metal films 33 and 28 are formed under the reflective pixel electrode 30, the number of via-hole forming processes can be reduced by one compared with the related art 2. Namely, the via-hole forming processes can be three, i.e., a first via hole Via1 forming process, a second via hole Via2 forming process, and a third via hole Via3 forming process.

At this time, the resistance value of the second light blocking metal film 33 is higher than those of the first to third metal films 26, 28, and 30 made of aluminum wiring. However, there is no need of lowering the resistance value of the second light blocking metal film 33 because an aim of the film 33 is to block light and form a storage capacitor to be explained later and the film 33 is not required to have a function of wiring to pass current. Namely, the high resistance of the second light blocking metal film 33 causes no adverse effect on electric characteristics, and the film 33 sufficiently functions to meet the above-mentioned aim.

As shown in FIG. 6, the shape of the second light blocking metal film 33 in each pixel is square, is a size smaller than the square reflective pixel electrode (third metal film) 30, and is electrically isolated pixel by pixel like the reflective pixel electrode 30. To separate the second light blocking metal film 33 pixel by pixel, the opening 33a is formed between adjacent second light blocking metal films 33 as shown in FIG. 4. At this time, the first light blocking metal films 28 cover the openings 30a formed between adjacent reflective pixel electrodes 30 as mentioned above, and therefore, there will be no problem even if the openings 33a formed between adjacent second light blocking metal films 33 substantially agree with the openings 30a formed between adjacent reflective pixel electrodes 30.

According to the first embodiment, the first light blocking metal films 28 cover the openings 30a formed between adjacent reflective pixel electrodes 30. It is possible to make any one of the layers of the first and second light blocking metal films 28 and 33 cover the openings 30a formed between adjacent reflective pixel electrodes 30. In this case, the positions of the first and second light blocking metal films 28 and 33 relative to the positions of the reflective pixel electrodes 30 may slightly be shifted from those shown in FIG. 4, and the positions of the second and third via holes Via2 and Via3 may slightly be shifted from those shown in FIG. 4.

As mentioned above, the first and second light blocking metal films 28 and 33 are arranged between the p-type Si substrate 11 and the reflective pixel electrodes 30, so that part of color-image read light L made incident from the transparent substrate 42 side and penetrated the third interlayer insulating film 29 through the openings 30a formed between adjacent reflective pixel electrodes 30 may simply repeatedly be reflected and absorbed in the third interlayer insulating film 29 by the reflective pixel electrodes 30 and the second light blocking metal films 33 formed on and under the third interlayer insulating film 29, as indicated with dotted lines in FIG. 4. Namely, part of the read light L does not reach the MOSFETs 14 formed on the p-type Si substrate 11. This configuration suppresses light leakage in the MOSFETs 14 due to part of read light L.

As shown in FIGS. 5A and 6, the reflective pixel electrode (third metal film) 30 and first light blocking metal film (second metal film) 28 in a given pixel are electrically connected to each other by etching the third interlayer insulating film 29 made of $SiO_2$ from the position substantially corresponding to the center of the reflective pixel electrode 30. Further, the second light blocking metal film 33 made of conductive TiN, Ti, or TiN/Ti, the light blocking insulating film 32 made of $SiO_2$, SiN, or SiON, and the antireflection film 31 made of conductive TiN are simultaneously etched to form the third via hole Via3. The third via hole Via3 is filled with conductive tungsten 35 by CVD method. As a result, a lower end of the tungsten 35 is electrically connected to the first light blocking metal film (second metal film) 28, an intermediate part of the tungsten 35 is electrically connected to the second light blocking metal film 33, and an upper end of the tungsten 35 is electrically connected to the reflective pixel electrode 30 through the antireflection film 34 made of conductive TiN.

Generally, an oxide film etching apparatus (not shown) is designed to etch only oxide films, and therefore, an etching rate of the apparatus for Al (aluminum) is low. Namely, the etching apparatus is designed to carry out selective etching. The oxide film etching apparatus can easily etch the third via hole Via3, and at the same time, TiN, Ti, or TiN/Ti of the second light blocking metal film 33.

After forming the third via hole Via3, it is not necessarily required to fill the third via hole Via3 with the tungsten 35. For example, as shown in FIG. 5B, the third interlayer insulating film 29 may be etched from the position substantially corresponding to the center of the reflective pixel electrode 30, and the second light blocking metal film 33, light blocking insulating film 32, and antireflection film 31 may simultaneously be etched to form the third via hole Via3. Thereafter, a standard spattering process is employed to form an antireflection film 34 of TiN and a reflective pixel electrode 30 of aluminum wiring in the third via hole Via3. This results in electrically connecting the reflective pixel electrode 30, second light blocking metal film 33, and first light blocking metal film 28 to one another in each pixel.

In this way, the third via hole Via3 has a role of electrically connecting the reflective pixel electrode (third metal film) 30, second light blocking metal film 33, and first light blocking metal film (second metal film) 28 to one another in each pixel. As a result, the second light blocking metal film 33 needs no dedicated via hole, to simplify processes including lithography and etching processes for manufacturing the reflective LCD.

Next, a formation of the storage capacitor for the MOSFET 14 will be explained in connection with the related art 1 as a comparison example and the present invention with reference to FIGS. 7A and 7B.

In FIG. 7A, the comparison example, i.e., the related art 1 provides the MOSFET 14 formed on the p-type Si substrate 11 with the single storage capacitor C consisting of the diffused capacitor electrode 21, insulating film 22, capacitor electrode 23, and capacitor electrode contact 24 formed on the p-type Si substrate 11.

On the other hand, the present invention of FIG. 7B forms the storage capacitor C1 composed of the diffused capacitor electrode 21, insulating film 22, capacitor electrode 23, and capacitor electrode contact 24 on the p-type Si substrate 11. In addition, the present invention forms the second light blocking metal film 33 over the first light blocking metal film (second metal film) 28/antireflection film 31 (FIGS. 5A and 5B) through the light blocking insulating film 32. As a result, storage capacitors C2 and C3 are formed in each pixel between the first light blocking metal film (second metal film) 28 and the second light blocking metal film 33 on the left and right sides of the third via hole Via3, respectively. In each pixel, the reflective pixel electrode (third metal film) 30, second light blocking metal film 33, and first light blocking metal film (second metal film) 28 are electrically connected to the MOSFET 14 and storage capacitor C1.

If SiN or SiON having a large dielectric constant is used for the light blocking insulating film 32, the storage capacitance value of each of the storage capacitors C2 and C3 will increase. For example, the light blocking insulating film 32 may be made of SiN having a dielectric constant of 9. The light blocking insulating film 32 may be made of $SiO_2$ having a dielectric constant of 4.2. The light blocking insulating film 32 made of SiN can increase the storage capacitance value two times or greater than that made of $SiO_2$.

According to the present invention, the three storage capacitors C1 to C3 can increase a total storage capacitance value greater than that of the related art 1, to reduce potential variations at the reflective pixel electrodes 30 and prevent flickering and burning.

FIG. 8 shows reflectance values of SiN and $SiO_2$ films each formed as the light blocking insulating film 32 on the first light blocking metal film (second metal film) 28/antireflection film 31 (FIGS. 5A and 5B). As a reference example, reflectance values of only the first light blocking metal film (second metal film) 28 made of aluminum wiring are shown. It is understood from FIG. 8 that the light blocking insulating film made of SiN can decrease reflectance lower than that made of $SiO_2$. Accordingly, light blocking effect will increase by using SiN or SiON instead of $SiO_2$ for the light blocking insulating film 32. $SiO_2$ has a refractive index of 1.45. On the other hand, SiN has a refractive index of about 2.0 and SiON a refractive index of about 1.8 each being higher than that of $SiO_2$. A combination of the light blocking insulating film 32 having such a high refractive index and the second light blocking metal film 33 having a light absorbing capability further increases the light blocking effect.

Figure 2A:
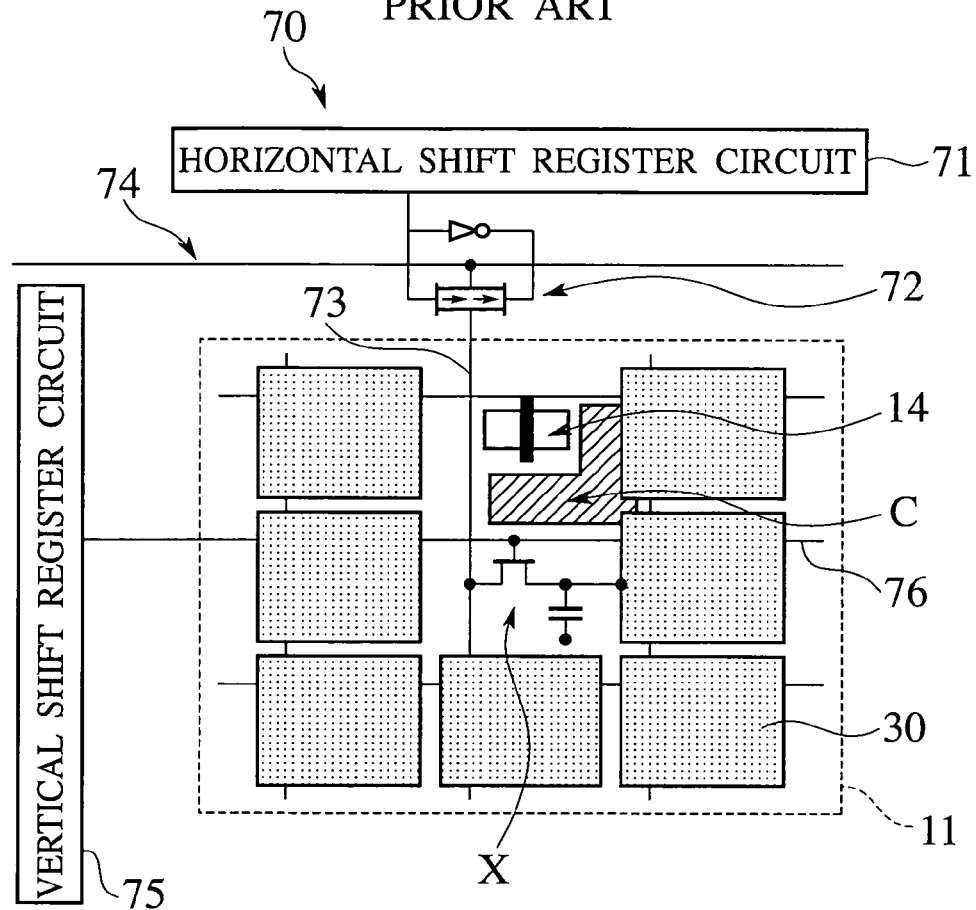
FIG. 2A is a block diagram explaining an active-matrix drive circuit in the reflective LCD of the related art 1.
Figure 2B:
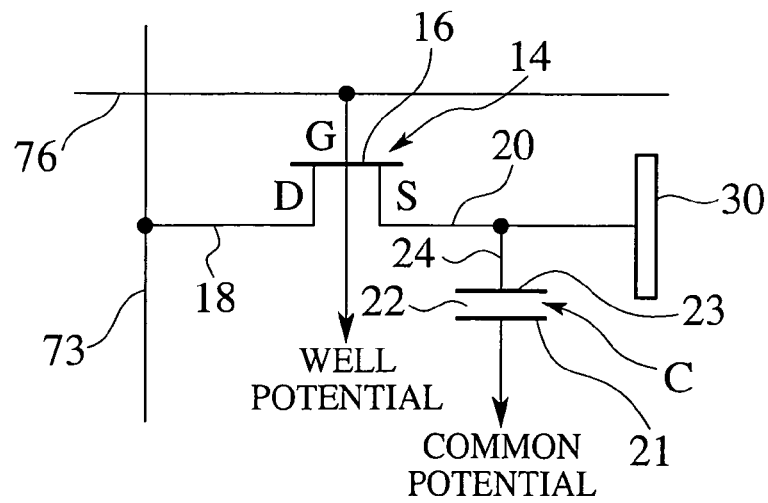
FIG. 2B is an enlarged view schematically showing a part X of FIG. 2A.

The operation of the reflective LCD 10B according to the first embodiment of the present invention having the above-mentioned configuration is substantially the same as that of the reflective LCD according to the related art 1 explained with reference to FIGS. 2A and 2B, and therefore, the explanation thereof will be omitted. According to the present invention, the source electrode 20 (or drain electrode 18) of the MOSFET (switching element) 14 is connected to the three storage capacitors C1 to C3. Namely, the sum of storage capacitance values of the storage capacitors C1 to C3 is applied between the source electrode 20 (or drain electrode 18) and the common potential COM. This is different from the related art 1.

A method of manufacturing the reflective LCD 10B according the first embodiment of the present invention will be explained with reference to FIGS. 9A to 9G in order of processes of the method.

FIGS. 9A to 9G are sectional views sequentially showing first to seventh processes of the method of manufacturing the reflective LCD according to the first embodiment of the present invention.

In the first process of FIG. 9A, known techniques are employed to form, for each pixel, a MOSFET (switching element) 14, a storage capacitor C1, and field oxide films 13A to 13C on a p-type Si substrate (semiconductor substrate) 11. Over them, sequentially formed are a first interlayer insulating film 25, a first metal film 26, a second interlayer insulating film 27, and a first light blocking metal film (second metal film) 28/antireflection film 31 (shown only in FIGS. 5A and 5B). At this time, the first metal film 26 is electrically connected to the MOSFET 14 and storage capacitor C1 through aluminum wiring filled in first via holes Via1, and the first light blocking metal film (second metal film) 28 is electrically connected to the first metal film 26 through aluminum wiring filled in a second via hole Via2. Openings 28a are formed by lithography patterning and etching in the first light blocking metal film (second metal film) 28/antireflection film 31 (FIGS. 5A and 5B), to segment and electrically isolate the first light blocking metal film (second metal films) 28 pixel by pixel.

In the second process of FIG. 9B, a light blocking insulating film 32 is formed on the first light blocking metal film (second metal film) 28/antireflection film 31 (FIGS. 5A and 5B) from $SiO_2$, SiN, or SiON to a thickness of, for example, 300 nm by CVD.

In the third process of FIG. 9C, a second light blocking metal film 33 is formed on the light blocking insulating film 32 from TiN, Ti, or TiN/Ti to a thickness of, for example, 70 nm by sputtering. Openings 33a are formed in the light blocking metal film 33 by lithography patterning and etching, to segment and electrically isolate the second light blocking metal film 33 pixel by pixel.

In the fourth process of FIG. 9D, a third interlayer insulating film 29 is formed on the second light blocking metal film 33 from $SiO_2$ to a thickness of, for example, 700 nm. The surface of the third interlayer insulating film 29 is flattened by, for example, chemical mechanical polishing (CMP).

In the fifth process of FIG. 9E, third via holes Via3 are formed in the third interlayer insulating film 29 by lithography patterning and etching. At this time, the second light blocking metal film 33 and light blocking insulating film 32 are simultaneously etched up to the first light blocking metal film (second metal film) 28. Since the second light blocking metal film 33 is made of TiN, Ti, or TiN/Ti, it can easily be etched with an oxide film etching apparatus (not shown).

In the sixth process of FIG. 9F, the third via holes Via3 is filled with a film of tungsten 35 from above the third interlayer insulating film 29 by CVD. The tungsten 35 is buried in the third via holes Via3 by etch-back and CMP. Instead of that, it is possible to spatter aluminum in the third via holes Via3 and etch back the aluminum to bury the same in the third via holes Via3. As a result, the tungsten 35 or aluminum is electrically connected to the second light blocking metal film 33 and first light blocking metal film (second metal film) 28.

In the seventh process of FIG. 9G, an antireflection film 34 (shown only in FIGS. 5A and 5B)/reflective pixel electrode (third metal film) 30 is formed on the third interlayer insulating film 29 by aluminum spattering. Openings 30a are formed in the reflective pixel electrodes 30 by lithography patterning and etching to segment and electrically isolate the reflective pixel electrode 30 pixel by pixel. At this time, the antireflection film 34 (FIGS. 5A and 5B)/reflective pixel electrode (third metal film) 30 in each pixel is electrically connected to the tungsten 35 or aluminum in the corresponding third via hole Via3. This completes the formation of the functional films on the p-type Si substrate 11.

The configuration of the embodiment more properly prevents light leakage to the MOSFETs 14 than that of the related art 1, to realize finer pixels. Accordingly, the present invention can form more pixels in a given screen area than the related art 1, to realize high resolution.

The present invention can reduce the number of via-hole forming processes by one compared with the related art 2, even if the first and second light blocking metal films 28 and 33 with the insulating films 27, 32, and 29 on and under the films 28 and 33 are formed between the p-type Si substrate 11 and the reflective pixel electrodes 30. In addition, the present invention connects, in each pixel, the second light blocking metal film 33 to the MOSFET 14, storage capacitors C1 to C3, and reflective pixel electrode 30 through the first and second metal films 26 and 28 formed on and under the film 33 when forming the via holes. This configuration can increase a storage capacitance value for each MOSFET 14.

Second Embodiment

FIG. 10 is an enlarged sectional view schematically showing a pixel in a reflective LCD according to the second embodiment of the present invention.

The reflective LCD 10C according to the second embodiment of the present invention of FIG. 10 is realized by partly changing the locations of the first and second light blocking metal films of the reflective LCD 10B of the first embodiment of the present invention. Only the difference of the second embodiment from the first embodiment will briefly be explained.

The second embodiment forms no light blocking metal film over a first light blocking metal film (second metal film) 28. Instead, the second embodiment forms a second light blocking metal film 37 over a first metal film 26 with a light blocking insulating film 36 interposed between the films 26 and 37. Due to this, the second embodiment forms the first light blocking metal film 28 over the second light blocking metal film 37 with a second interlayer insulating film 27 interposed between the films 37 and 28. The first light blocking metal film 28 covers openings 30a formed between adjacent reflective pixel electrodes 30 formed over the first light blocking metal film 28.

The names of the first and second light blocking metal films 28 and 37 have no correspondence to order of formation of these films. The same reference numeral is allocated for the first light blocking metal film that is formed at the same position as the first light blocking metal film of the first embodiment.

According to the second embodiment, no light blocking metal film is formed over the first light blocking metal film (second metal film) 28, and therefore, there is only one storage capacitor C for each pixel on a p-type Si substrate 11, like the related art 1 explained with reference to FIG. 1.

The light blocking insulating film 36 mentioned above is formed from $SiO_2$, SiN, or SiON to a thickness of 400 nm or thinner. The second light blocking metal film 37 mentioned above is formed from TiN, Ti, or TiN/Ti having a low reflectance to a thickness in the range of 50 nm to 200 nm.

According to the second embodiment, when a second via hole Via2 is formed to connect the first light blocking metal film (second metal film) 28 to the first metal film 26, tungsten or aluminum in the second via hole Via2 electrically connects the first light blocking metal film 28, second light blocking metal film 37, and first metal film 26 to one another. Accordingly, the second embodiment is also capable of reducing the number of via-hole forming processes by one compared with the related art 2. Namely, the second embodiment can reduce the number of via-hole forming processes to three to form the first to third via holes Via1 to Via3.

According to the reflective LCD 10C of the second embodiment having the above-mentioned arrangement, part of color-image read light L made incident from a transparent substrate 42 may penetrate a third interlayer insulating film 29 through the openings 30a formed between adjacent reflective pixel electrodes 30. The penetrated light is repeatedly reflected in the third interlayer insulating film 29 between the reverses of the reflective pixel electrodes 30 made of aluminum wiring and the surfaces of the first light blocking metal films 28 made of aluminum wiring. Thereafter, part of the read light L penetrates the second interlayer insulating film 27 through openings 28a formed between adjacent first light blocking metal films 28. Then, the light is repeatedly reflected and absorbed in the second interlayer insulating film 27 by the upper and lower first and second light blocking metal films 28 and 37 as indicated with dotted lines in FIG. 10. Namely, part of the read light L never reaches the MOSFETs 14 formed on the p-type Si substrate 11. In this way, the second embodiment prevents light leakage to the MOSFETs 14 due to part of the read light L.

Third Embodiment

Figure 11:
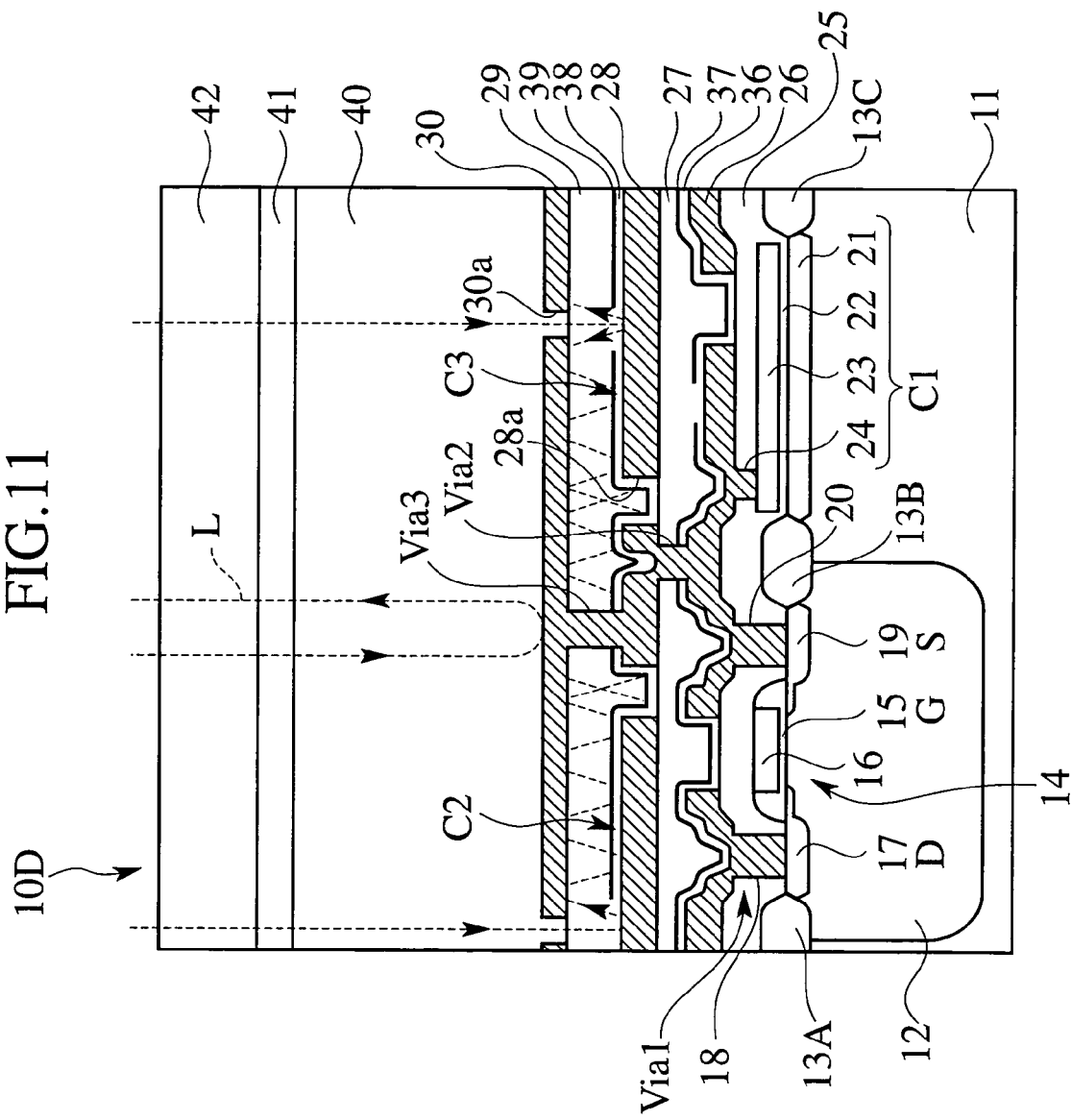
FIG. 11 is an enlarged sectional view schematically showing a pixel in a reflective LCD according to a third embodiment of the present invention.
Figure 12:
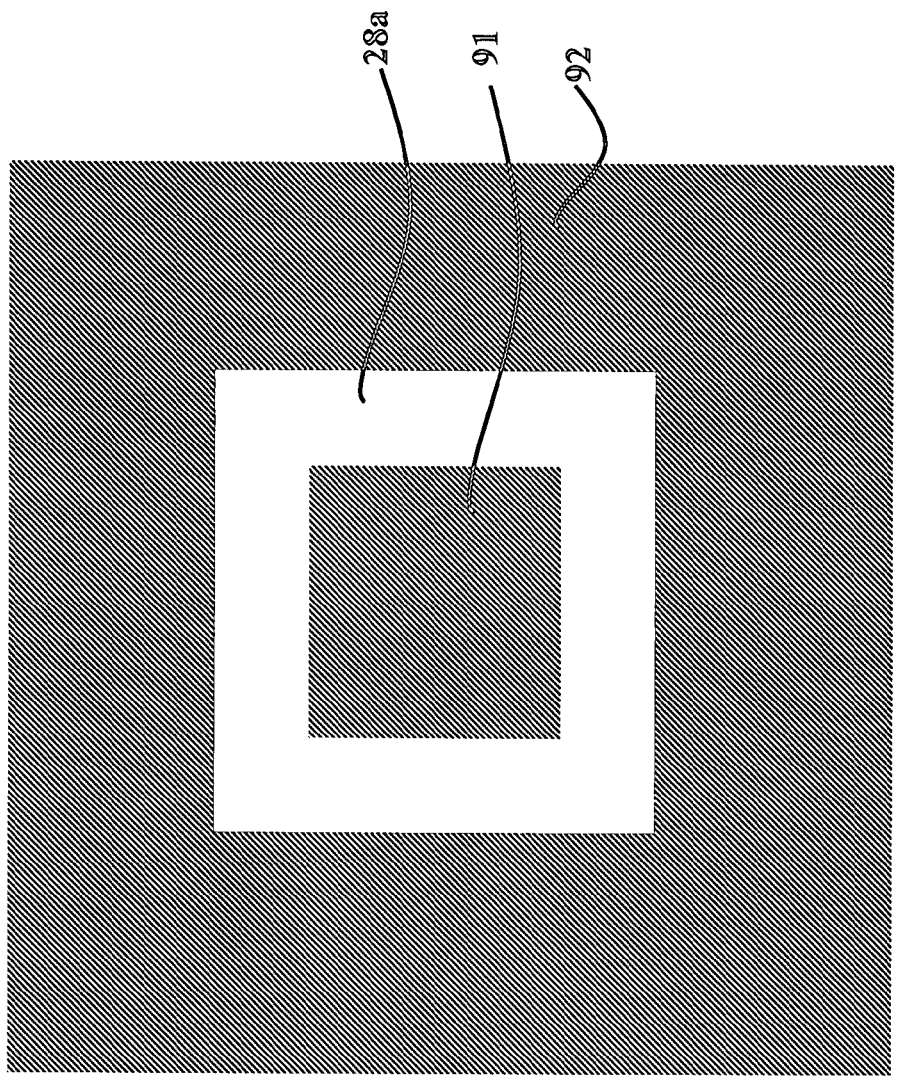
FIG. 12 is a sectional view of an embodiment of FIG. 4 taken along the XII-XII line.

FIG. 11 is an enlarged sectional view showing a pixel in a reflective LCD according to the third embodiment of the present invention.

The reflective LCD 10D according to the third embodiment of the present invention of FIG. 11 is a combination of the light blocking metal films of the reflective LCDs 10B and 10C according to the first and second embodiments of the present invention. Only the difference of the third embodiment from the first and second embodiments will briefly be explained.

Like the second embodiment, the third embodiment forms a second light blocking metal film 37 over a light blocking insulating film 36 that is formed on a first metal film 26. In addition, like the first embodiment, the third embodiment forms a third light blocking metal film 39 over a light blocking insulating film 38 formed on a first light blocking metal film (second metal film) 28. The third light blocking metal film 39 covers openings 28a formed between adjacent first light blocking metal films 28.

The names of the first, second, and third light blocking metal films 28, 37, and 39 do not correspond to order of formation of these films. The same reference numerals are allocated for the first and second light blocking metal films that are formed at the same positions as the first and second light blocking metal films of the first and second embodiments. The third light blocking metal film that is formed at the position of the second light blocking metal film of the first embodiment is provided with a different reference numeral.

The light blocking insulating films 36 and 38 are made of SiO$_2$, SiN, or SiON each to a thickness of 400 nm or thinner. The second and third light blocking metal films 37 and 39 are made of TiN, Ti, or TiN/Ti each to a thickness in the range of 50 nm to 200 nm.

According to the third embodiment, when a second via hole Via2 is formed in each pixel to connect the first light blocking metal film (second metal film) 28 to the first metal film 26, tungsten or aluminum in the second via hole Via2 electrically connects the first light blocking metal film 28, second light blocking metal film 37, and first metal film 26 to one another. When a third via hole Via3 is formed in each pixel to connect a reflective pixel electrode (third metal film) 30 to the first light blocking metal film (second metal film) 28, tungsten or aluminum in the third via hole Via3 electrically connects the reflective pixel electrode 30, third light blocking metal film 39, and first light blocking metal film 28 to one another. As a result, the third embodiment is also capable of reducing the number of via-hole forming processes by one compared with the related art 2. Namely, the third embodiment can reduce the number of via-hole forming processes to three to form the first to third via holes Via1 to Via3.

The third embodiment can further suppress light leakage to MOSFETs 14 due to part of color-image read light L than the first and second embodiments. Naturally, the third embodiment provides each MOSFET 14 in each pixel with a storage capacitor C1 formed on a p-type Si substrate 11 like the first embodiment, as well as storage capacitors C2 and C3 formed between the first light blocking metal film (second metal film) 28 and the third light blocking metal film 39 on the left and right sides of the third via hole Via3. The three storage capacitors C1 to C3 provide a greater total capacitance value than the capacitor of the related art 1, to suppress potential variations at the reflective pixel electrodes 30 and prevent flickering and burning.

As mentioned above, each of the first to third embodiments forms at least two light blocking metal films between the p-type Si substrate 11 and the reflective pixel electrodes 30 with an insulating film being laid on and under each of the light blocking metal films. The number of via-hole forming processes involved in each of the embodiments is smaller than that of the related art 2 by one. When forming via holes, the embodiments can connect, in each pixel, the light blocking metal films to the MOSFET 14, storage capacitors C1 to C3 (or C1), and reflective pixel electrode 30 through the metal films formed on and under the light blocking metal films. In addition, the embodiments can provide each MOSFET 14 with a larger storage capacitance value.

It should be understood that many modifications and adaptations of the invention will become apparent to those skilled in the art and it is intended to encompass such obvious modifications and changes in the scope of the claims appended hereto.

What is claimed is:

1. A reflective liquid crystal display having pixels arranged in a matrix, comprising:
   a semiconductor substrate;
   a transparent substrate that transmits light;
   switching elements formed for the respective pixels on the semiconductor substrate and electrically isolated from one another;
   first storage capacitors provided for the respective switching elements and electrically isolated from one another;
   reflective pixel electrodes provided for the respective pixels and having first openings therebetween to be electrically isolated from one another;
   a transparent counter electrode formed on a reverse of the transparent substrate to face the reflective pixel electrodes;
   liquid crystals sealed between the reflective pixel electrodes and the transparent counter electrode;
   light blocking metal films formed between the semiconductor substrate and the reflective pixel electrodes for the respective pixels and having first portions, second portions, and second openings, each second opening bound on one side by a respective first portion and on the other side by a respective second portion, the second openings electrically isolating the first portions from the second portions, wherein the second openings do not face the first openings, and the light blocking metal films block at least part of light which is part of light which has transmitted through the transparent substrate and which has intruded into the light blocking metal films side through the first openings;

normal metal films formed between the semiconductor substrate and the reflective pixel electrodes for the respective pixels and having third openings therebetween to be electrically isolated from one another, each normal metal film being electrically connected to a switching element and a first storage capacitor corresponding thereto; and light blocking metal-containing films formed between the semiconductor substrate and the reflective pixel electrodes for the respective pixels and electrically isolated from one another, wherein the reflective pixel electrodes and the first portions of the light blocking metal films are electrically connected to each other through first via holes; the first portions of the light blocking metal films and the normal metal films are electrically connected to each other through second via holes; and accordingly each reflective pixel electrode is electrically connected to the switching element and the first storage capacitor corresponding thereto, and wherein the light blocking metal-containing films are electrically connected to the first via holes and cover the second openings of the light blocking metal films in order to prevent the light which has intruded into the light blocking metal films side through the first openings from reaching the switching elements through the second openings.

2. The reflective liquid crystal display according to claim 1, further comprising:

insulating films formed between the light blocking metal films and the light blocking metal-containing films, wherein the insulating films between the second portion of the light blocking metal films and the light blocking metal-containing films facing the second portion serve as second storage capacitors.

3. The reflective liquid crystal display according to claim 2, wherein thickness of the insulating films is set to be equal to or thinner than 400 nm.

4. The reflective liquid crystal display according to claim 2, wherein the insulating films are made of a material selected from the group consisting of SiN and SiON.

5. The reflective liquid crystal display according to claim 1, wherein the light blocking metal-containing films are made of a material selected from the group consisting of TiN, Ti, and layered TiN/Ti.

* * * * *